US010128510B2

(12) United States Patent
Chen et al.

(10) Patent No.: US 10,128,510 B2
(45) Date of Patent: Nov. 13, 2018

(54) ADVANCED ELECTROCATALYSTS FOR OXYGEN REDUCTION REACTION

(71) Applicant: UWM Research Foundation, Inc., Milwaukee, WI (US)

(72) Inventors: Junhong Chen, Kenosha, WI (US); Zhenhai Wen, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 446 days.

(21) Appl. No.: 14/173,430

(22) Filed: Feb. 5, 2014

(65) Prior Publication Data

US 2014/0220479 A1    Aug. 7, 2014

Related U.S. Application Data

(60) Provisional application No. 61/760,764, filed on Feb. 5, 2013.

(51) Int. Cl.
*H01M 4/86* (2006.01)
*H01M 4/90* (2006.01)

(52) U.S. Cl.
CPC ....... *H01M 4/8657* (2013.01); *H01M 4/9041* (2013.01)

(58) Field of Classification Search
CPC .......................... H01M 4/8657; H01M 4/9041
See application file for complete search history.

(56) References Cited

U.S. PATENT DOCUMENTS

2007/0212538 A1* 9/2007 Niu ........................ H01B 1/04
428/367

OTHER PUBLICATIONS

Atkinson et al., "Synthesis and characterization of iron-impregnated porous carbon spheres prepared by ultrasonic spray pyrolysis", Oct. 8, 2010, Elvsevier, CARBON 49 (2011) 587-598.*
Rao et al., "In Search of the Active Site in Nitrogen-Doped Carbon Nanotube Electrodes for the Oxygen Reduction Reaction", The Journal of Physical Chemistry Letters, 2010, 2622-2627, Published Aug. 20, 2010 (Year: 2010).*
Fedoseeva., "Effect of oxidation and heat treatment on the morphology and electronic structure of carbon-encapsulated iron carbide nanoparticles", Materials Chemistry and Physics 2012, 235-240, Published Aug. 9, 2011 (Year: 2011).*
Byon, H.R., et al., "Graphene-based non-noble-metal catalysts for oxygen reduction reaction in acid," Chemistry of Materials, vol. 23, pp. 3421-3428 (2011).
Chen, R., et al., "Unraveling Oxygen Reduction Reaction Mechanisms on Carbon-Supported Fe-Phthalocyanine and Co-Phthalocyanine catalysts in Alkine Solutions," Journal of Physical Chemistry, vol. 113, pp. 20689-20697 (2009).

(Continued)

*Primary Examiner* — Jimmy Vo
(74) *Attorney, Agent, or Firm* — Michael Best & Friedrich LLP

(57) ABSTRACT

Provided are nanocomposites including an iron-based core and a nitrogen-doped graphitic carbon shell, and methods of making and using the same. Included in the nanocomposites is an $Fe_3C$-based interlayer between the core and the shell. The nanocomposites can show a catalytic activity toward reducing oxygen comparable to commercial Pt/C catalysts.

20 Claims, 30 Drawing Sheets

(56) References Cited

OTHER PUBLICATIONS

Chen, X. et al., "Fe-g-C3N4-catalyzed oxidation of benzene to phenol using hydrogen peroxide and visible light," J. Am. Chem. Soc., 131, 11658-11659 (2009).
Cheng, F. et al., " MnO2-Based Nanostructures as catalysts for electrochemical oxygen reduction in alkaline media," Chemistry of Materials, vol. 22, pp. 898-905 (2010).
Cho, K. et al., "Designing PbSe nanowires and nanorings through oriented attachment of nanoparticles," J. Am. Chem. Soc, 127, 7140-7147 (2005).
Chung, "Cyanamide-derived non-precious metal catalyst for oxygen reduction," journal, Electrochemistry Communications (2010).
Collman, J.P. et al., "A cytochrome c Oxidase Model Catalyzes oxygen to water reduction under rate-limiting electron flux," Science, vol. 315, 1565-1568 (2007).
Cracknell, J. et al., "Enzymes as workign or inspirational electrocatalysts for fuel cells and electrolysis," Chemical Reveiws, vol. 108, pp. 2439-2461 (2008).
El-Deab, M. et al., "Electrochemical Reduction of Oxygen on Gold Nanoparticle-Electrodeposited Glassy Carbon Electrodes," J. Electrochem. Soc., 150, 7, A851-A857 (2003).
Fischer, A. et al., "Synthesis of ternary metal nitride nanoparticels using mesoporous carbon nitride as reactive template," ACS Nano, vol. 2, pp. 2489-2496 (2008).
Giordano, C. et al., "Non-conventional Fe3C0based nanostructures," Journal of Materials Chemistry, vol. 21, pp. 16963-16967 (2011).
Gong, K. et al., "Nitrogen-doped carbon nanotube arrays with high electrocatalytic activity for oxygen reduction," Science, vol. 323, pp. 760-764 (2009).
Greeley, J. et al., "Alloys of platinum and early transition metals as oxygen reduction electrocatalysts," Nature Chemistry, vol. 1, pp. 552-556 (2009).
He, Z. et al., "An upflow microbial fuel cell with an interior cathodeL assessment of the internal resistance by impedance spectroscopy," Environ. Sci. Technol. 40, 5212-5217 (2006).
Huo, J. et al., "Structural transformation of carbon-encapsulated iron nanoparticles during heat treatment at 1000 C," Materials and Chemistry Physics, vol. 101, pp. 221-227 (2005).
Huo, J. et al., "From carbon-encapsulated iron nanorods to carbon nanotubes," journal of physical chemistry, vol. 112, pp. 5835-5839 (2008).
Jansinski, R., "A New Fuel Cell Cathode Catalyst," Nature, vol. 201, pp. 1212-1213 (1964).
Jun, Y.S. et al., "Mesoporous, 2D hexagonal carbon nitride and titanium nitride/carbon composites," Advanced Materials, vol. 21, pp. 4270-4274 (2009).
Kim, H. et al., "Iron nanoparticles in carbon nanotubes at various tempratures," Journal of Crystal Growth, vol. 276, pp. 594-605 (2005).
Lefevre, M., et al., "Iron-based catalysts with improved oxygen reduction activity in polymer electrolyte fuel cells," Science, vol. 324, pp. 71-74 (2009).
Liang, Y., et al., "Co3O4 nanocrystals on grphene as a synergistic catalyst for oxygen reduction reaction," Nature Materials, vol. 10, pp. 780-786 (2011).
Lin-Jie "Novel carbon nanostructures prepared by solid-stae pyrolysis of iron phthalocyanine," journal, New Carbon Materials (2006).
Liu, R.L. et al., "Nitrogen-Doped Ordered Mesoporous Graphitic Arrays with High Electrocatalystic Activity for Oxygen Reduction," Angewandte Chemie, vol. 122, pp. 2619-2623 (2010).
Morozan, A. et al., Low-platinum and platinum-free caatlysts for the oxygen reduction reaction at fuel cell cathodes, vol. 4, pp. 1238-1254 (2011).
Nekooi, P. et al., "CoSe nanoparticles prepared by the microwave-assisted polyol method as an alcohol and formic acid tolerant oxygen reduction cataylst," International Journal of Hydrogen Energy, vol. 35, pp. 6392-6398 (2010).
Ning, L. et al., Synthesis and characterization of carbon-encapsulated iron/iron carbide nanoparticles by a detonation method, Carbon 48, 3858-3863 (2010).
Penn, R. et al., "Imperfect oriented attachment: dislocation generation in defect-free nanocrystals," Science, 281, 969-971 (1998).
Proietti, E. et al., "Iron-baseed cathode catalyst with enhanced power density in polymer electrolyte membrane fuel cells," Nature Communications, vol. 2, pp. 416-425 (2011).
Snyder, J., et al., "Oxygen reduction in nanoporous metal-ionic liquid composite electrocatalysts," Nature Materials, vol. 9, pp. 904-907 (2010).
Stamenkovic, V. et al., "Improved Oxygen Reduction Activity on Pt3Ni(111) via increased surface site availability," Science, vol. 315, pp. 493-497 (2007).
Suntivich, J. et al., "Design principles for oxygen-reduction activity on perovskite oxide catalysts for fuel cells and metal-air batteries," Nature Chemistry, vol. 3.7, pp. 546-550 (2011).
Thorum, M.S. et al., "Oxygen reduction activity of a copper complex of 3,5-diamino-1,2,4-triazole supported on carbon black," Angewandte Chemie, vol. 121, pp. 171-173 (2009).
Vayssilov, G.N. et al., "Support nanostructure boosts oxygen transfer to catalytically active platinum nanoparticles," Nature Materials, vol. 10, pp. 310-315 (2011).
Wang, X. et al., "A metal-free polymeric photocatalyst for hydrogen production from water under visible light," Nature Mater, 8, 76-80 (2009).
Wen, Z. et al., "Core/shell PT/C nanoparticles embedded in mesoporous carbon as a methanol-tolerant cathode catalyst in direct methanol fuel cells," vol. 20, 743-747 (2008).
Wu, B. et al., "Formation mechanism of carbon-encapsulated iron nanorods in a co-carbonication process," Carbon, vol. 49, pp. 890-894 (2011).
Wu, G. et al., "high-performance electrocatalysts for oxygen reduction derived from polyaniline, iron, and cobalt," Science, vol. 332, pp. 443-447 (2011).
Xiong, W. et al., "3-D carbon nanotube structures used as high performance catalyst for oxygen reduction reaction," Journal of the American Chemical Society, vol. 132, pp. 15839-15841 (2010).
Zhang, F. et al., "Powering a wireless temperature sensor using seidment microbial fuel cells with vertical arrangement of electrodes," Journal of Power Sources, vol. 196, pp. 9568-9573 (2011).
Zhou, Y. et al., " Enhancement of Pt and Pt Alloy fuel cell catalyst activity and durability via nitrogen-modified carbon supports," Energy Environmental Science, vol. 3, pp. 1437-1446 (2010).
Bouwkamp-Wijnoltz et al., "On Active-Site Heterogeneity in Pyrolyzed Carbon-Supported Iron Porphyrin Catalysts for the Electrochemical Reduction of Oxygen: An In Situ Mössbauer Study," article (2002) J. Phys. Chem. B, 106, pp. 12993-13001.
Jaouen et al., "Oxygen Reduction Catalysts for Polymer Electrolyte Fuel Cells from the Pyrolysis of Iron Acetate Adsorbed on Various Carbon Supports," article (2003) J. Phys. Chem. B, 107, pp. 1376-1386.
Jiang, et al., "Iron Carbide Nanoparticles Encapsulated in Mesoporous Fe—N-Doped Graphene-Like Carbon Hybrids as Efficient Bifunctional Oxygen Electrocatalysts," article (2015) ACS Appl. Mater. Interfaces, 7, pp. 21511-21520.
Lefèvre et al., "Molecular Oxygen Reduction in PEM Fuel Cells: Evidence for the Simultaneous Presence of Two Active Sites in Fe-Based Catalysts," article (2002) J. Phys. Chem. B, 106, pp. 8705-8713.
Bashyam, Rajesh et al., A class of non-precious metal composite catalysts for fuel cells, Nature, 2006, 443:63-66, (included, Supplementary Information pp. 1-10).
Chen, Wei et al. Effect of Confinement in Carbon Nanotubes on the Activity of Fischer-Tropsch Iron Catalyst, J. Am. Chem. Soc., 2008, 130:9414-9419 (included, Supplementary Information pp. S1-S4).
Lee, Jang-Soo et al., A Highly Efficient Electrocatalyst for the Oxygen Reduction Reaction: N-Doped Ketjenblack Incorporated into Fe/Fe3C-Functionalized Melamine Foam, Angew. Chem., 2013, 52:1060-1064 (included, 10 pages of Supplementary Information).
Lefevre, Michel et al., Iron-Based Catalysts with Improved Oxygen Reduction Activity in Polymer Electrolyte Fuel Cells, Science, 2009, 324:71-74 (included, Supplementary Information pp. 1-15).

(56) References Cited

OTHER PUBLICATIONS

Wen, Zhenhai et al., Nitrogen-Enriched Core-Shell Structured Fe/Fe3C—C Nanorods as Advanced Electrocatalysts for Oxygen Reduction Reaction, Adv. Mater. 2012, 24:1399-1404 (included, 20 pages of Supplementary Information).

Yu, Guobin et al. FexOy@C Spheres as an Excellent Catalyst for Fischer-Tropsch Synthesis, J. Am. Chem. Soc., 2010: 935-937(included, Supplementary Information pp. S1-S9).

\* cited by examiner

ADVANCED ELECTROCATALYSTS FOR OXYGEN REDUCTION REACTION

CROSS-REFERENCE TO RELATED APPLICATIONS

The present application claims priority to U.S. Provisional Application No. 61/760,764, filed Feb. 5, 2013, the entire contents of which is hereby incorporated by reference.

STATEMENT REGARDING FEDERALLY SPONSORED RESEARCH

This invention was made with government support under contract nos. CMMI-0900509 and CBET-1033505 awarded by the National Science Foundation and contract no. DE-EE0003208 awarded by the U.S. Department of Energy. The government has certain rights in the invention.

BACKGROUND

Fuel cells have received increasing attention as a valuable source of clean energy. However, due to the costs associated with the materials that go into making fuel cells, they are not economically feasible for use in many applications.

A key impediment of fuel cell implementation involves the oxygen reduction reaction (ORR). Because ORR is a kinetically slow process, ORR performance dominates the overall performance of fuel cell technologies. Currently, platinum-based catalysts are the most commonly used and studied for ORR. Consequently, due to the high-cost, limited supply, and limited efficiency of platinum-based catalysts, there still exists a need for cost-effective materials that can efficiently reduce oxygen.

SUMMARY

In one aspect, provided are nanocomposites. The nanocomposites may comprise an iron-based composite core and a carbon shell. The nanocomposites may be a nanorod. The nanocomposites may include a diameter from about 20 nm to about 30 nm. The nanocomposites may also include a length of about 1 µm to about 2 µm. The nanocomposites may comprise nitrogen. The nanocomposites may include an interlayer between the core and the shell. The core of the nanocomposites may also include a crystalline structure.

The nanocomposites may include one or more X-ray diffraction peaks that correspond to the presence of α-Fe. The nanocomposites may include one or more X-ray diffraction peaks that correspond to (002) planes of graphitic carbon. Additionally, the nanocomposites may include X-ray diffraction peaks that correspond to the crystalline planes of $Fe_3C$. The nanocomposites may also include about 48.5% iron, about 45.2% carbon, and about 6.3% nitrogen.

In another aspect, this disclosure provides uses of a nanocomposite as electrocatalysts to reduce oxygen. Additionally, this disclosure provides electrodes comprising the nanocomposite. Furthermore, this disclosure provides fuel cells comprising the nanocomposite.

In another aspect, provided are methods of synthesizing a nanocomposite. The methods may comprise forming a $Fe^{3+}$/cyanamide composite. The methods may further comprise annealing the $Fe^{3+}$/cyanamide composite. Forming the $Fe^{3+}$/cyanamide composite may include drying at a temperature of less than about 500° C. Annealing the $Fe^{3+}$/cyanamide composite may include one or more of the following: polymerizing the cyanamide at a temperature of less than about 600° C.; heating the composites to a temperature of about 750° C.; heating at a rate of about 4° C./minute; maintaining the temperature at about 750° C. for about 3 hours; and reducing the $Fe^{3+}$ to Fe.

Other aspects of the invention will become apparent by consideration of the detailed description and accompanying drawings.

DETAILED DESCRIPTION

Figure 1:
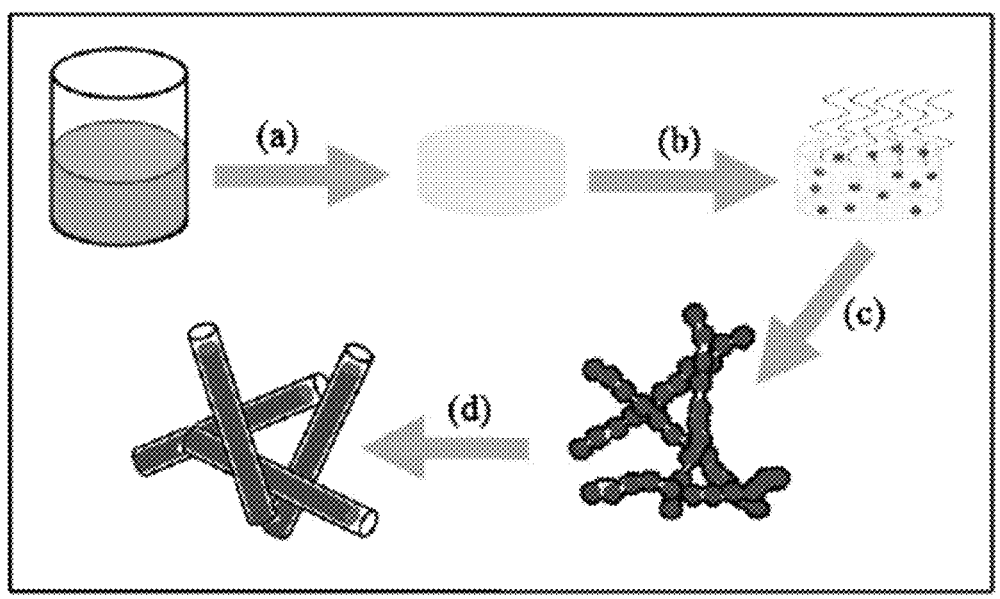
FIG. 1 is a schematic of synthesizing the nanocomposites; a) forming the $Fe^{3+}$/cyanamide composite and b)-d) annealing the $Fe^{3+}$/cyanamide composite.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The present invention is directed to nanocomposites having the capacity to reduce oxygen in a cost-effective and efficient manner. In fuel cell technology, there is a disconnect between cost and efficiency and their ultimate implementation as a clean energy source. The key issue of this disconnect is the reduction of oxygen at an electrode of a fuel cell. Current materials used to catalyze this reaction are too costly and inefficient to be economically feasible.

The nanocomposites disclosed herein utilize a structure comprising an iron-based composite core, carbon shell and the presence of nitrogen to effectively reduce oxygen. The core-shell structure and its synthesis allow the nanocomposites to be prepared in a cost-effective manner, which can be implemented as an electrode within a fuel cell. The nanocomposites, when used as an electrode in a fuel cell, demonstrate superior electrochemical properties compared to platinum-based catalysts. Furthermore, the nanocomposites can be used in acidic, basic or neutral buffers while maintaining enhanced stability, thus allowing use in numerous types of fuel cells. These characteristics allow for a cost-effective, efficient material that enhances the potential for fuel cells as a clean energy source.

1. Nanocomposites

Disclosed herein are nanocomposites that can be used for ORR in a cost-effective and efficient manner. The nanocomposites disclosed herein may include at least an iron-based composite core and at least a carbon shell. The nanocomposites may utilize a core-shell structure to perform efficient, catalytic oxygen reduction. The nanocomposites may include an interlayer between the core and the shell. In certain embodiments, the interlayer may be about 0.36 nm. The nanocomposites may further comprise a dopant. The dopant may comprise nitrogen. Doped nitrogen may be advantageous in synthesizing the nanocomposite and may enhance its catalytic potential. In certain embodiments, the nanocomposites may comprise N—Fe/Fe$_3$C@C nanorods. In certain embodiments, the nanocomposites may include about 48.5% iron, about 45.2% carbon and about 6.3% nitrogen.

In certain embodiments, the nanocomposites may be a nanorod. The nanocomposites may comprise a diameter of about 20 nm to about 30 nm. The nanocomposites may comprise a length of about 1 μm to about 2 μm. The nanocomposites may include open-end and/or close-end structures.

In certain embodiments, the nanocomposites may include one or more XRD peaks that correspond to the presence of α-Fe. In certain embodiments, the XRD peaks that correspond to α-Fe may include peaks at about 44.8° and about 65.1°. The nanocomposites may also include XRD peaks that correspond to the (002) planes of graphitic carbon. In certain embodiments, the XRD peak that corresponds to (002) planes of graphitic carbon may include a peak at about 26.5°. Furthermore, the nanocomposites may include XRD peaks that correspond to the crystalline planes of Fe$_3$C.

Without wishing to be bound by any particular theory, a key element in the catalytic capability of the nanocomposites may be its core. The nanocomposites may comprise an iron-based composite core. The iron-based composite core may comprise carbon. The iron-based composite core may comprise $Fe_3C$. The iron-based composite core may include a crystalline structure. In certain embodiments, the crystalline structure may include lattice spacing of about 0.21 nm.

Without wishing to be bound by any particular theory, another key element of the nanocomposites may be the shell. The nanocomposites may comprise a carbon shell. In certain embodiments, the carbon shell may comprise graphite.

2. Use of Nanocomposites

The nanocomposites may be used as an electrocatalyst for the reduction of oxygen. The nanocomposites may be used in an electrode. The nanocomposites may further be used in a fuel cell. The fuel cell may include any fuel cell where oxygen is reduced at an electrode. Since the nanocomposites can function in alkaline, acidic and neutral media, there are a number of fuel cell applications where it can be applied. The different type of fuel cells may include proton exchange membrane fuel cells, MFCs, formic acid fuel cells, alkaline fuel cells, methanol fuel cells, ethanol fuel cells, phosphoric fuel cells, direct carbon fuel cells, regenerative fuel cells, and metal-air batteries. The nanocomposites may further be used in applications where Pt-based catalysts are currently used for ORR. Additionally, the nanocomposites may be used for chlorine-generation.

The nanocomposites exhibit significant advantages for ORR compared to materials that are presently used in fuel cells. Specifically, the nanocomposites have ultra-high activity and improved kinetics, while also showing excellent stability in a fuel cell environment.

3. Methods of Making the Nanocomposites

Provided herein are methods of making the nanocomposites. The methods may comprise forming a $Fe^{3+}$/cyanamide composite and annealing the $Fe^{3+}$/cyanamide composite.

The $Fe^{3+}$/cyanamide composite may be formed at a temperature less than about 500° C. In certain embodiments, forming the $Fe^{3+}$/cyanamide composite may comprise drying at a temperature of less than about 500° C.

The $Fe^{3+}$/cyanamide composite may then be annealed at a temperature of about 750° C., and this temperature may be maintained for about 3 hours. In certain embodiments, annealing the $Fe^{3+}$/cyanamide composite comprises heating the $Fe^{3+}$/cyanamide composite to a temperature of about 750° C. In certain embodiments, annealing the $Fe^{3+}$/cyanamide composite comprises maintaining the temperature at about 750° C. for about 3 hours. In certain embodiments, annealing the $Fe^{3+}$/cyanamide comprises polymerizing the cyanamide at a temperature of less than about 600° C. In certain embodiments, polymerizing the cyanamide at a temperature of less than about 600° C. may occur before heating the $Fe^{3+}$/cyanamide composite to a temperature of about 750° C. In certain embodiments, annealing the $Fe^{3+}$/cyanamide composite may include heating at a rate of about 4° C./min. In certain embodiments, annealing the $Fe^{3+}$/cyanamide composite may comprise reducing $Fe^{3+}$ to Fe.

Figure 2:
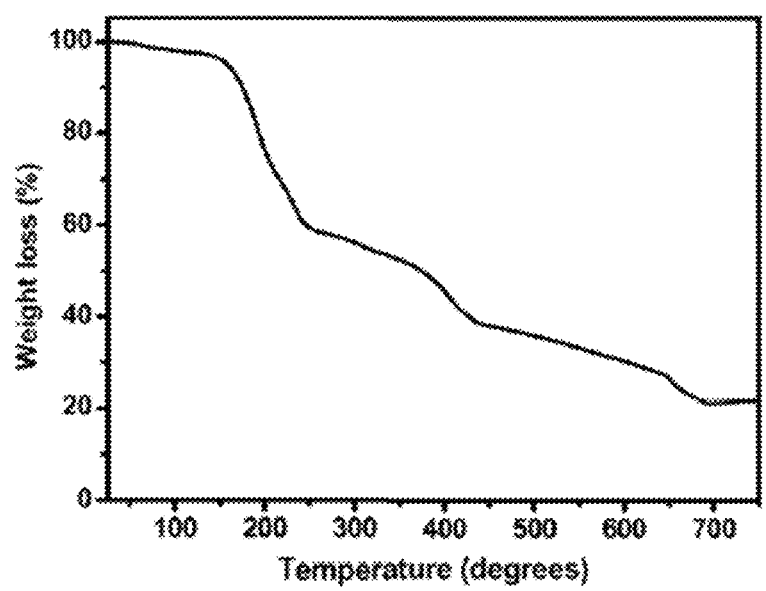
FIG. 2 shows thermal gravimetric analysis data of the drying $Fe^{3+}$/cyanamide composite of Example 1.

FIG. 1 illustrates a proposed mechanism of making the nanocomposites, which includes: at first, $Fe^{3+}$ may be uniformly adsorbed in the cyanamide powder during the initial stage, with continuous stirring until completely dry. The following annealing may lead to the polymerization of cyanamide, carbonization of polymer and the reduction of $Fe^{3+}$ to Fe nanoparticles by the carbonized carbons. This is inferred from the samples annealing at 600° C., which exhibit a poor crystallinity and electric conductivity (FIG. 2). The as-formed Fe-based nanoparticles then may begin to attach with each other, while orienting to form a 1D structure in order to minimize the interfacial energy. With the temperature reaching 700° C., the polymer may decompose to release a large amount of carbon-nitride gases (e.g. $C_2N_2^+$, $C_3N_2^+$, $C_3N_3^+$). These gases, on one hand, may provide sources for growing the nitrogen-doped graphite carbon shell with the assistance of Fe catalysts, and may also allowing the gases to react with the oriented Fe-based materials in the graphite shell and finally lead to the $Fe/Fe_3C$ composite core.

As mentioned above and in the examples, the nanocomposites demonstrate many advantages as catalysts for ORR. One significant advantage of the nanocomposites is a low cost and ease of synthesis. At the time of filing the provisional application, the cost of the raw materials for preparing the nanocomposites was less than 5% of the cost of the Pt/C catalysts (Pt 10%). This is significantly cheaper than precious-metal free catalysts as well. Accordingly, the methods described herein could be easily scaled up for mass production.

EXAMPLES

The foregoing may be better understood by reference to the following examples, which are presented for purposes of illustration and are not intended to limit the scope of the invention.

Throughout these examples, the terms "nanocomposite", "N—$Fe/Fe_3C$@C", "N—$Fe/Fe_3C$@C nanocomposite", and "N—$Fe/Fe_3C$@C nanorod" may be used interchangeably.

Example 1. Synthesis and Characterization of the Nanocomposites

Described below is the synthesis and characterization of the nanocomposites. The nanocomposites were synthesized by adding 10 ml of 50% cyanamide into 15 ml 0.8 M $FeCl_3$ aqueous solution under stirring, then the mixed solution was heated to 80° C. until the components were completely dried to form a tawny powder. The resultant powder was then transferred to the furnace and heated at 750° C. at a rate of 4° C./min, and the temperatures was maintained at 750° C. for 3 hours.

Characterization of the nanocomposites was done using a Zeiss EM902 80 KV Filter transmission electron microscope with Henry-Casting Energy, FEI Tecnai F20 (Philips) 200 keV high-resolution transmission electron microscope (HR-TEM), and a LEO 1530 field emission scanning electron microscope (FESEM). The XRD patterns were measured in reflection mode (Cu KR radiation) on a Bruker D8 diffractometer equipped with a scintillation counter. Elemental analysis of the samples to determine the nitrogen and carbon content was performed on a Vario Elementar instrument. XPS was conducted using VG ESCA 2000 with an Mg Kα as source and the C1s peak at 284.6 eV as an internal standard. The thermal gravimetric analysis was carried out on a Mettler Toledo TGA-SDTA851 analyzer from 25° C. to 900° C. under $N_2$ with a heating rate of 5° C./min. Fourier-transform infrared (FTIR) measurements were carried out on a Perkin-Elmer spectrophotometer operating in the infrared domain between 500 and 4000 $cm^{-1}$ by using a KBr matrix. Specific surface areas were measured by Brunauer-Emmett-Teller (BET) nitrogen adsorption-desorption (Shimadzu, Micromeritics ASAP 2010 Instrument).

Figure 3:
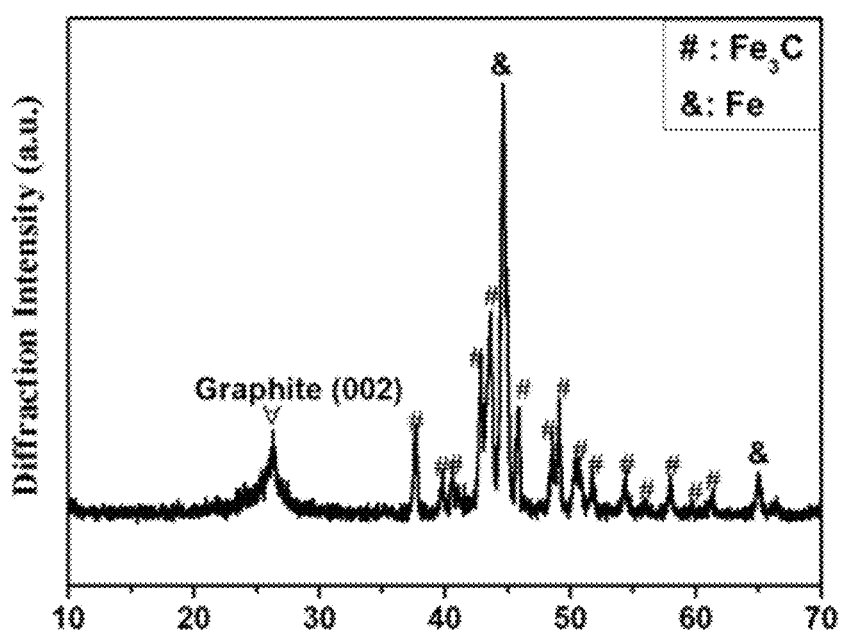
FIG. 3 shows the X-ray diffraction (XRD) pattern of the nanocomposites prepared in Example 1.

FIG. 3 shows the XRD patterns that were acquired for the synthesized nanocomposites. The diffraction peak at 26.5° corresponds to the (002) planes of graphitic carbon, while the peaks at 44.8° and 65.1° indicate the presence of large amounts of α-Fe (JCPDS, No. 87-0722, which is an XRD database/software provided by the International Center for Diffraction Data). Other diffraction peaks are characteristic of the crystalline planes of the $Fe_3C$ species (JCPDS, No. 89-2867). The XRD results suggested that the composites consist of the graphite carbon and $Fe/Fe_3C$ species.

Figure 4:
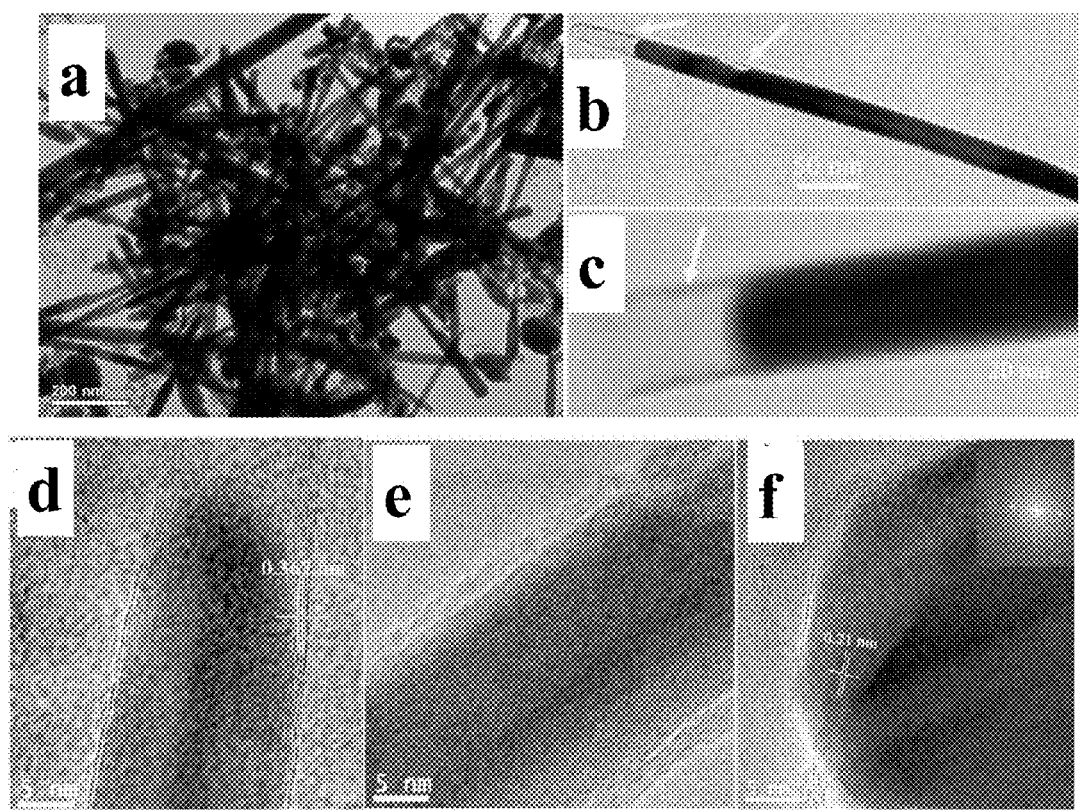
FIG. 4 shows transmission electron microscopy (TEM) images of the nanocomposites prepared in Example 1: a) TEM image of the N—Fe/$Fe_3C$@C nanorods; b) TEM image of a single N—Fe/$Fe_3C$@C nanorod with close-end graphite shell; c) TEM image of a single N—Fe/$Fe_3C$@C nanorod with open-end graphite shell; d) high resolution TEM image of a N—Fe/$Fe_3C$@C nanorod with open-end graphite shell; e) high resolution TEM image of the intermediate section of a N—Fe/$Fe_3C$@C nanorod; and f) high resolution TEM image of a N—Fe/$Fe_3C$@C nanorod with close-end graphite shell.
Figure 5:
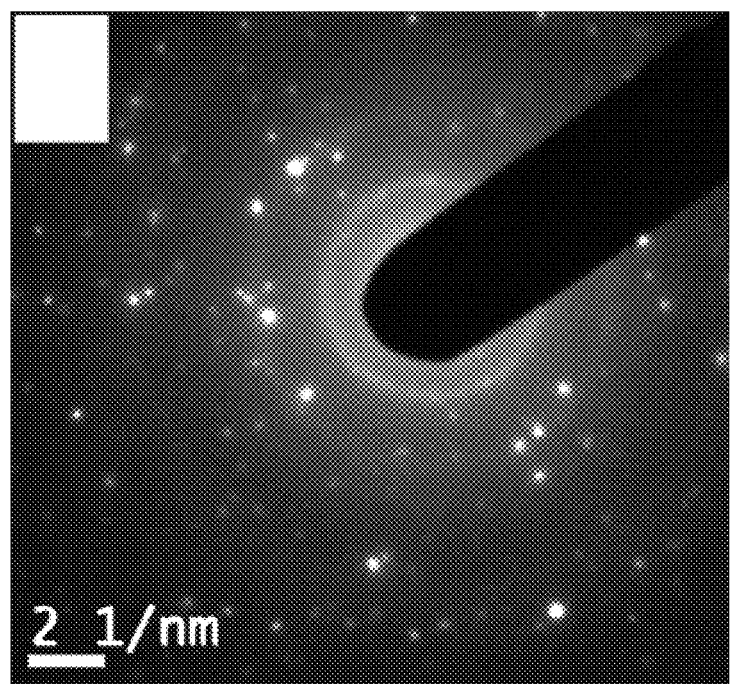
FIG. 5 shows the selected area electron diffraction (SAED) patterns of the nanocomposites prepared in Example 1.
Figure 6:
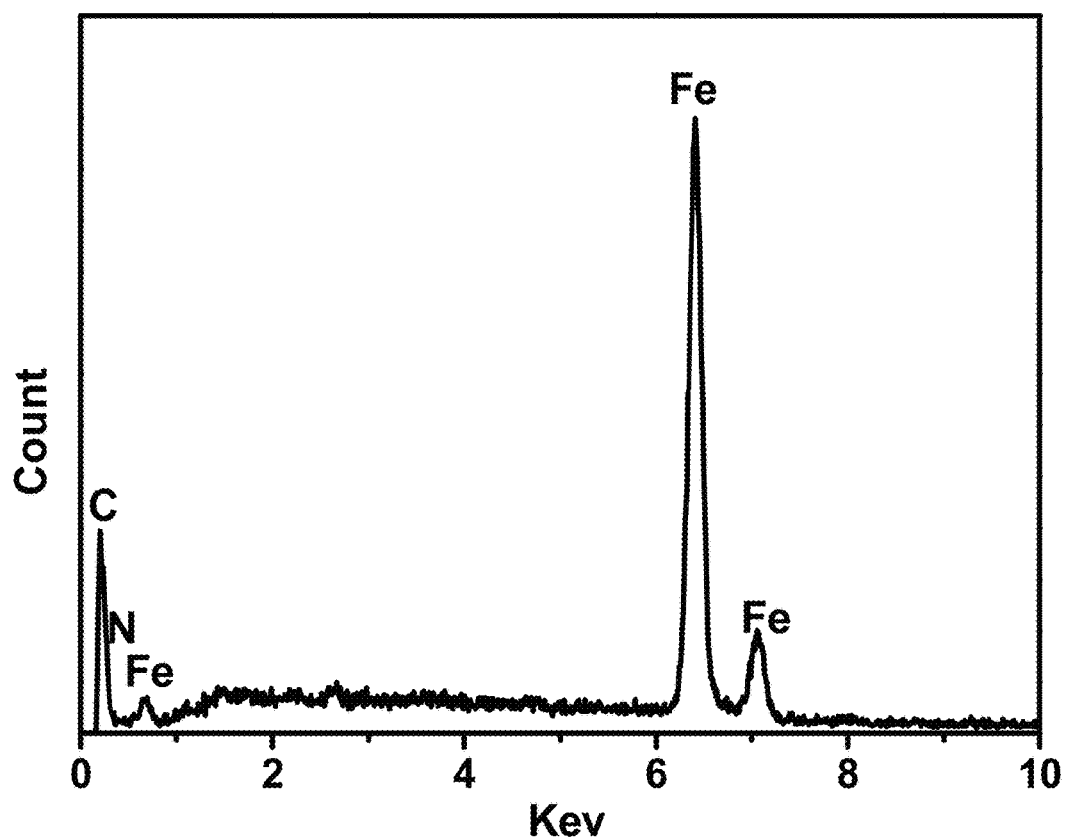
FIG. 6 is an energy-dispersive X-ray spectroscopy (EDS) of the nanocomposites prepared in Example 1.
Figure 7:
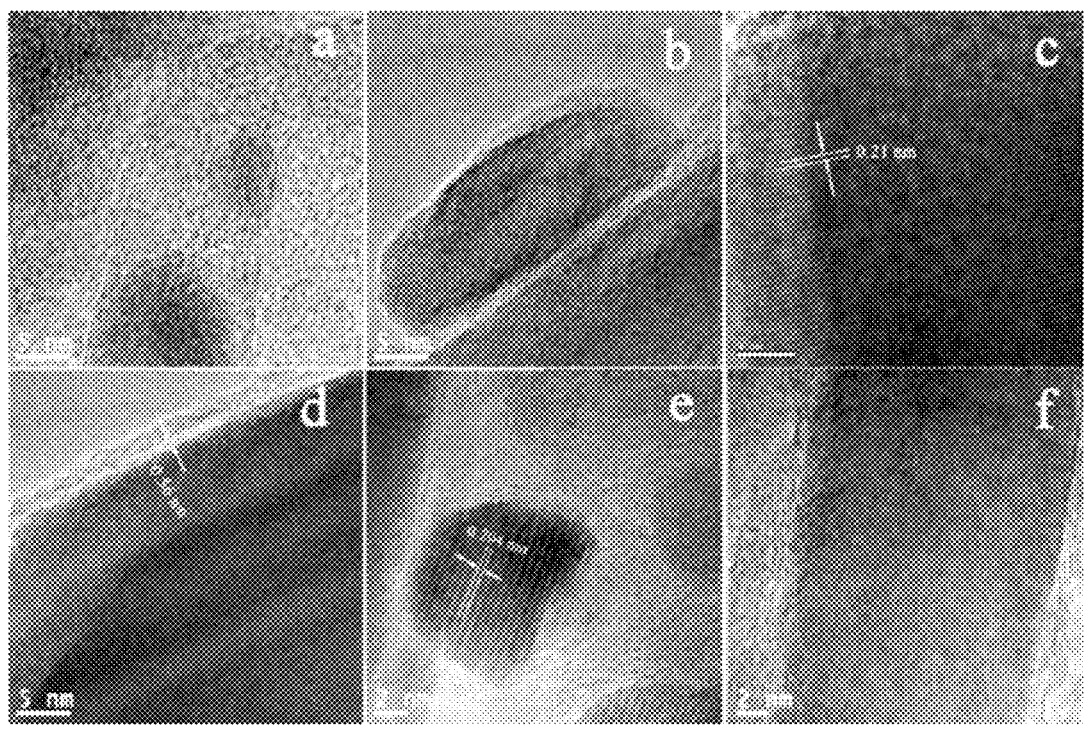
FIG. 7 shows high resolution TEM images of different regions of the nanocomposites prepared in Example 1: a) the end of an open graphite shell; b) a large nanorod with a small nanorod; c) the crystalline center of $Fe_3C$ core; d) the fringe of graphite-crystalline shell attached on an Fe/$Fe_3C$ nanorod; e) the nanorods coupled with core-shell Fe nanoparticles; and f) the nanorods with attached graphite-crystalline shell.

FIG. 4a shows a TEM image that was acquired showing the nanocomposites, indicating that the sample is dominated by 1D nanostructures with a few nanoparticles. Furthermore, the nanocomposites had a diameter of about 20~30 nm and a length of about 1~2 μm. FIG. 4b-c shows TEM images of single nanocomposites with close-end and open-end structures, respectively, and demonstrates that the nanocomposites possessed a distinctive core-shell structure with a thin film of graphitic carbon coating on the black solid nanorod ($Fe/Fe_3C$). FIG. 5 shows SAED patterns of the nanocomposites. Several rings were assigned to diffraction planes of the graphite carbon shell, while the scattered dots indicated that the core $Fe_3C$ bears a single crystalline structure. According to EDS, FIG. 6 shows a C peak at 0.20 keV with a N tail peak, and three Fe peaks at about 0.71, 6.39 and 7.05 keV corresponding with $FeL_{\alpha 1}$, $FeL_{\beta 1}$ and $FeL_{\gamma 1}$, respectively. This demonstrated that the nanocomposites were comprised of 48.5 wt. % Fe, 45.2 wt. % C and 6.3 wt. % N.

The detailed structure of the nanocomposites was further examined using high-resolution TEM (FIG. 4d-f, and FIG. 7). FIG. 4d-e display the end and the middle section of a core-shell nanocomposite, respectively. Graphite-like layers can be identified along the outer surface of the nanocomposites with an interlayer spacing of 0.36 nm. FIG. 4f depicts a nanocomposite that was formed with a closed shell, and a crystalline lattice spacing of 0.21 nm can be observed in the core, which is consistent with the (211) diffraction peak of $Fe_3C$.

To better understand the synthesis of the nanocomposites, a thermal gravity analysis was carried out on the $Fe^{3+}$/cyanamide composites to investigate its thermal properties (FIG. 2). The main weight loss occurred over two different temperature ranges. The first drastic weight loss in the range of 150-250° C. can be attributed to the existence of water and the polymerization reaction of cyanamide; the second weight loss process in the range of 400-700° C. corresponded with the decomposition of the cyanamide polymer that released the nitrogen containing gas for the carbide reaction and growth of the graphite layer. No significant weight loss was observed at temperatures above 700° C., suggesting that cyanamide decomposed completely and the reaction was finished. The calcining temperature was selected to be 750° C. for the preparation of the nanocomposites so that the cyanamide polymer could be completely decomposed to carbon-nitride gas for nitrogen doping and the carbide reaction. Additionally, the synthesized $F_3C$ does not decompose at this temperature.

Figure 8:
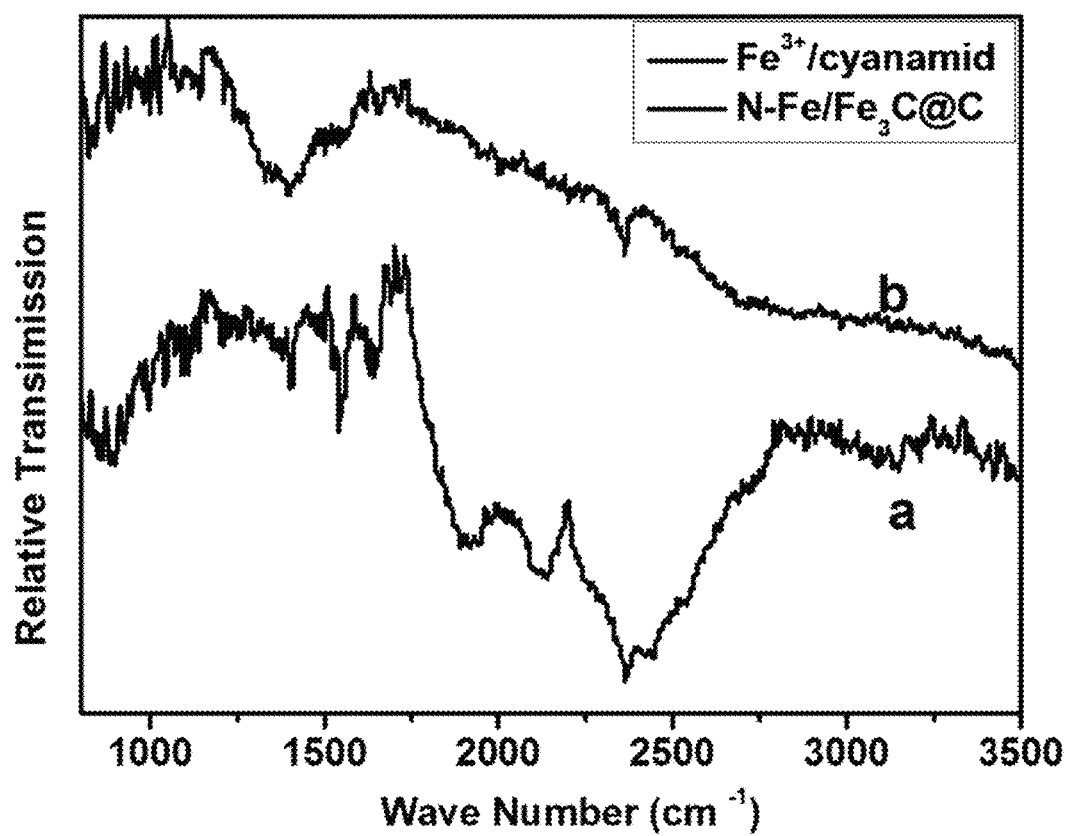
FIG. 8 shows the infrared spectra of (a) the drying $Fe^{3+}$/cyanamide composite powder and (b) the N—Fe/$Fe_3C$@C nanocomposites of Example 1.

FTIR spectra were used to identify changes of the functional groups from the $Fe^{3+}$/cyanamide composite powder to the nanocomposites. FIG. 8a showed the FTIR spectrum obtained from the $Fe^{3+}$/cyanamide composite powder and the series of peaks in the range of 1800~2500 $cm^{-1}$ were attributed to C—N and C≡N vibrations of CN—$NH_2$, respectively. The nanocomposites demonstrated a very different FTIR spectrum (FIG. 8b) due to the decomposition of CN—$NH_2$. One broad band appears at around 1400 $cm^{-1}$, which suggests the Fe—C bond; one weak band appears at 2300 $cm^{-1}$, which suggests the N-doped graphite shell. The bands in other regions were depressed greatly or vanished.

Example 2. Electrochemical Analysis of Nanocomposite

Described below is the electrochemical analysis of the nanocomposites carried out by CV. Measurements were performed using Gamry Reference 600 potentiostat (available commercially from Gamry Instruments, Warminster, Pa., USA). All experiments were conducted using a three electrode electrochemical cell, with a working electrode, an Ag/AgCl reference electrode and a platinum counter electrode. CV was taken from −0.5 V to 0.4 V in 0.1 M phosphate buffer solution (PBS, pH=7.0) with a scan rate of 50 $mVs^{-1}$. The polarization curves for ORR were conducted through the rotating disk electrode (RDE) technique with a scan rate of 5 mV/s. The current was normalized to the surface area of the electrode. The electrolyte was $N_2$ or $O_2$ saturated electrolyte (0.1 M PBS, pH=7.0).

Figure 9:
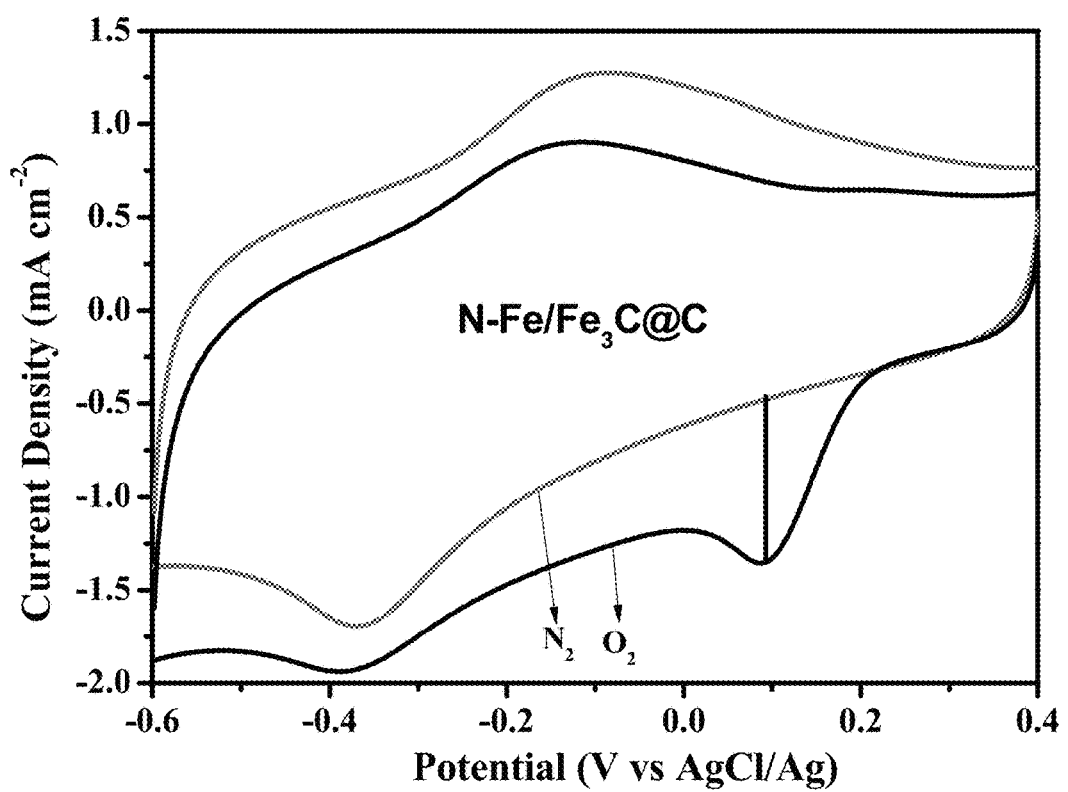
FIG. 9 shows Cyclic Voltammetry (CV) data for the N—Fe/$Fe_3C$@C electrode in $N_2$ (gray) and $O_2$ (black) saturated electrolyte of Example 2.
Figure 10:
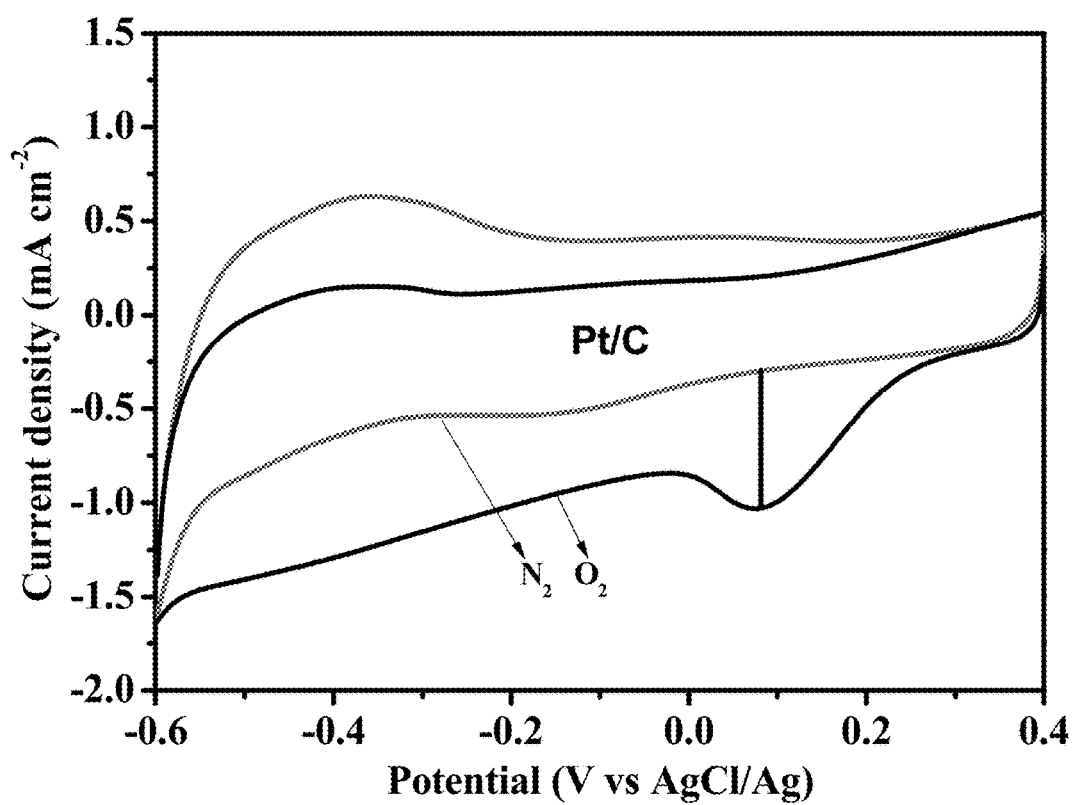
FIG. 10 shows CV data for the Pt/C electrode in $N_2$ (gray) and $O_2$ (black) saturated electrolyte of Example 2.

FIGS. 9 and 10 show CVs measured for the nanocomposites and Pt/C electrodes in $N_2$ and $O_2$ saturated phosphate buffer solution (0.1 M PBS, pH=7.0), respectively. Both electrodes showed one well-defined reduction peak at around 0.1 V in $O_2$ saturated PBS solution that can be contributed to electrocatalytic reduction of oxygen on these two electrodes. The catalytic activity was illustrated by the net peak current density (NPCD), which is calculated by subtracting the background current from the peak current. The NPCD reached about 0.91 mA $cm^{-2}$ for the nanocomposite electrode, while Pt/C catalyst (10% Pt) only exhibited an NPCD of 0.74 mA $cm^{-2}$. The higher NPCD of ORR suggests that the nanocomposites exhibit higher catalytic activity than the Pt/C catalyst.

Figure 11:
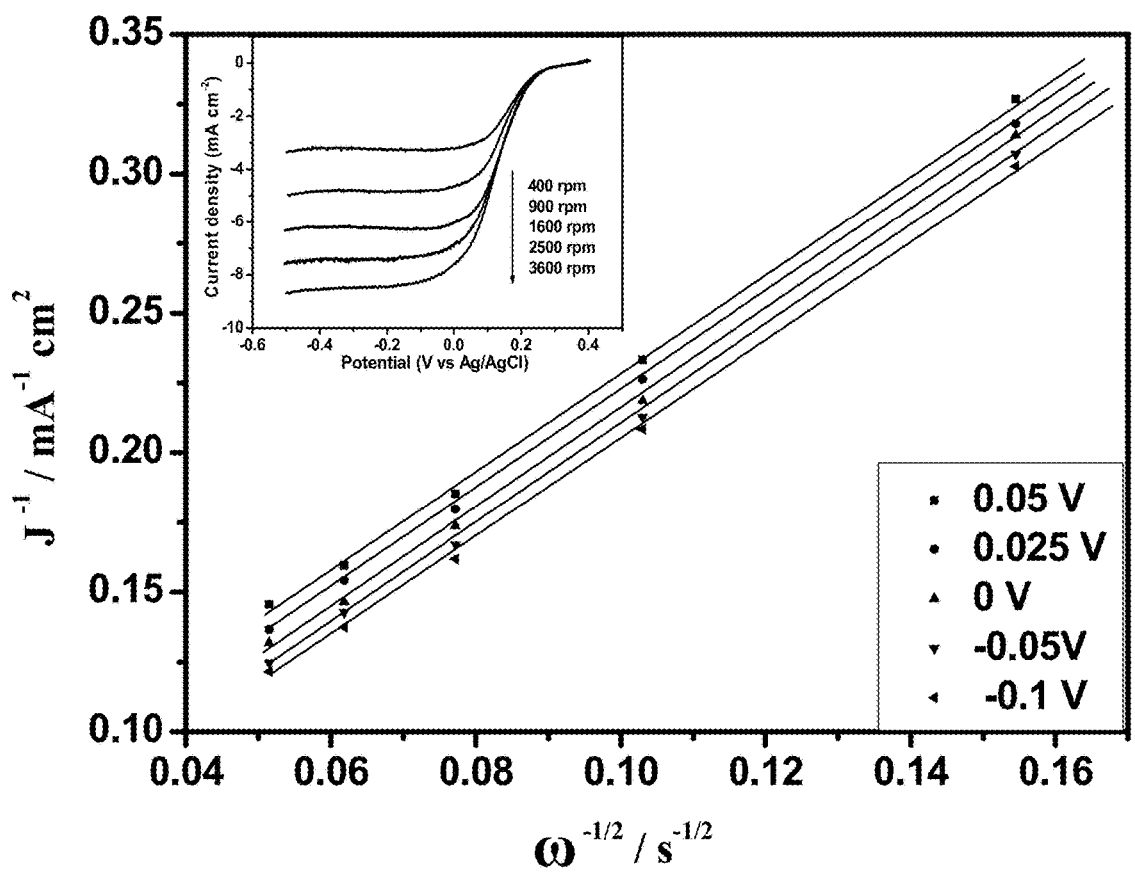
FIG. 11 shows a Koutecky-Levich (K-L) plot of current density versus $\omega^{-1/2}$ at different potentials on a N—Fe/$Fe_3C$@C electrode and the inset shows the polarization curves of ORR of Example 2.
Figure 12:
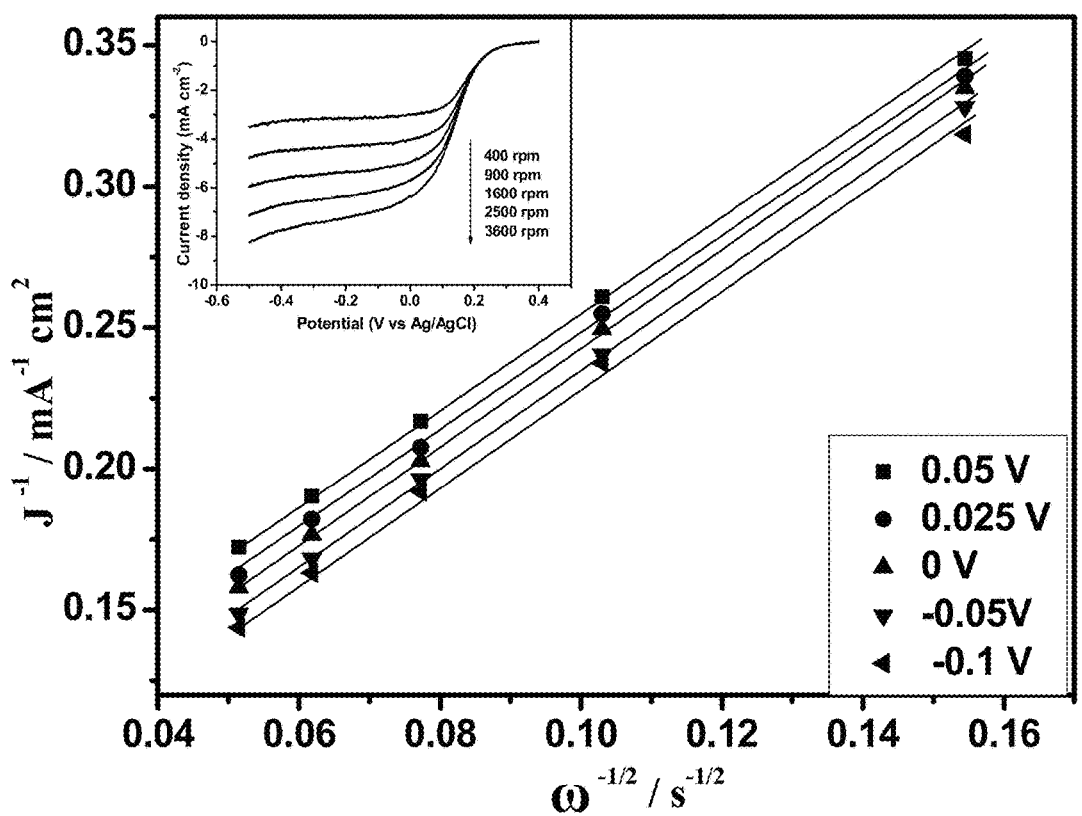
FIG. 12 shows a K-L plot of current density versus $\omega^{-1/2}$ at different potentials on a Pt/C electrode and the inset shows the polarization curves of ORR of Example 2.

RDE voltammograms were further collected to investigate the kinetics of electrochemical catalytic ORR at the nanocomposite and Pt/C electrodes. The polarization curves were obtained by scanning the potential from 0.4 to −0.5 V at a scan rate of 5 mV/s with different rotation rates (insets of FIG. 11, FIG. 12). FIGS. 11 and 12 show the corresponding K-L plots that demonstrate the inverse current density ($j^{-1}$) as a function of the inverse of the square root of the rotation speed ($\omega^{-1/2}$) at different potential values. The onset potential is positioned at above 0.21 V for the nanocomposite electrode and was slightly higher than that of the Pt/C electrode (below 0.21 V), indicating that the former exhibits a slightly lower overpotential of ORR. The K-L plots exhibited linearity with parallelism, suggesting a first-order dependence of $O_2$ kinetics at both electrodes. According to the K-L equation, the number of electrons transferred for ORR in the nanocomposites and Pt/C was calculated to be about 3.98 and 4.07, respectively, demonstrating that ORR at the nanocomposite and Pt/C electrodes predominantly proceed with the four-electron reaction pathway. Additionally, the kinetic current density was compared for both electrodes based on the intercept of the K-L plots (Table 1). The nanocomposites possess a much higher kinetic current density at different potential values than that of the Pt/C catalyst. For example, the nanocomposites exhibited a kinetic current density of 26.89 mA $cm^{-2}$ at 0 V; this value is nearly double that of the Pt/C catalyst (14.20 mA $cm^{-2}$). The higher kinetic current density of the nanocomposites suggests markedly improved dynamics for ORR relative to Pt/C catalyst.

TABLE 1

| Potential (V vs Ag/AgCl) | $K_{(N-Fe/Fe_3C@C)}$ (mA cm$^{-2}$) | $K_{(Pt/C)}$ (mA cm$^{-2}$) |
|---|---|---|
| 0.05 | 19.83733 | 11.52472 |
| 0.025 | 22.36136 | 13.20132 |
| 0 | 26.88895 | 14.20656 |
| −0.05 | 31.0752 | 16.39344 |
| −0.1 | 36.10108 | 16.86056 |

Figure 13:
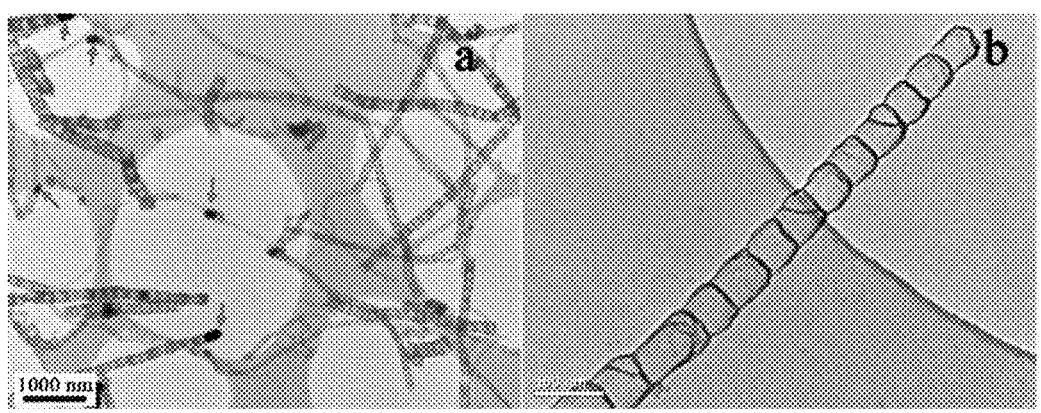
FIG. 13 shows (a) a TEM image of the N-doped multi-walled carbon nanotubes (MWCNT) with bamboo shape, where the arrows indicate the Fe nanoparticles; and (b) a TEM image of the single N-doped MWCNT of Example 2.
Figure 14:
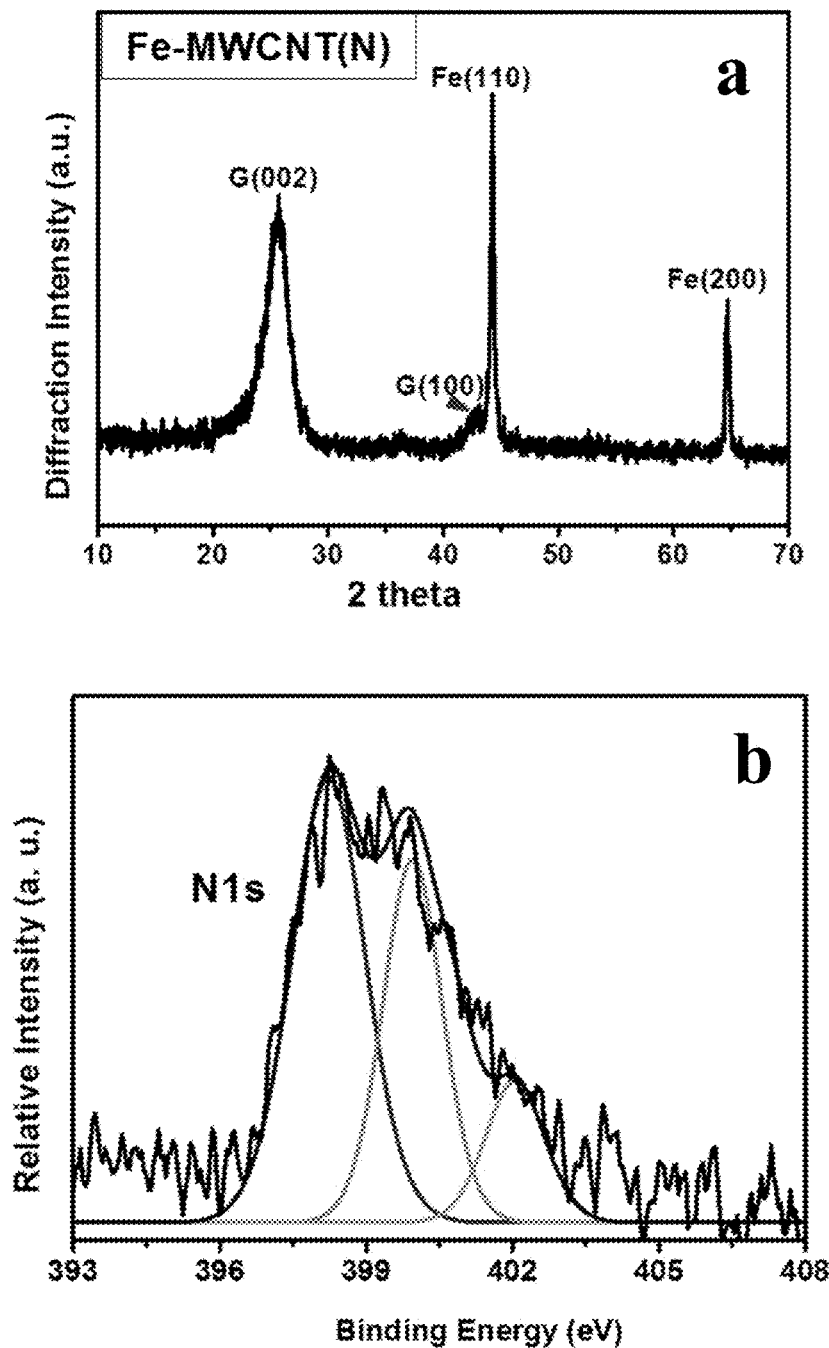
FIG. 14 shows (a) the XRD pattern of the N-doped MWCNT; and (b) the high-resolution XPS of N1s in N-doped MWCNT of Example 2.
Figure 15:
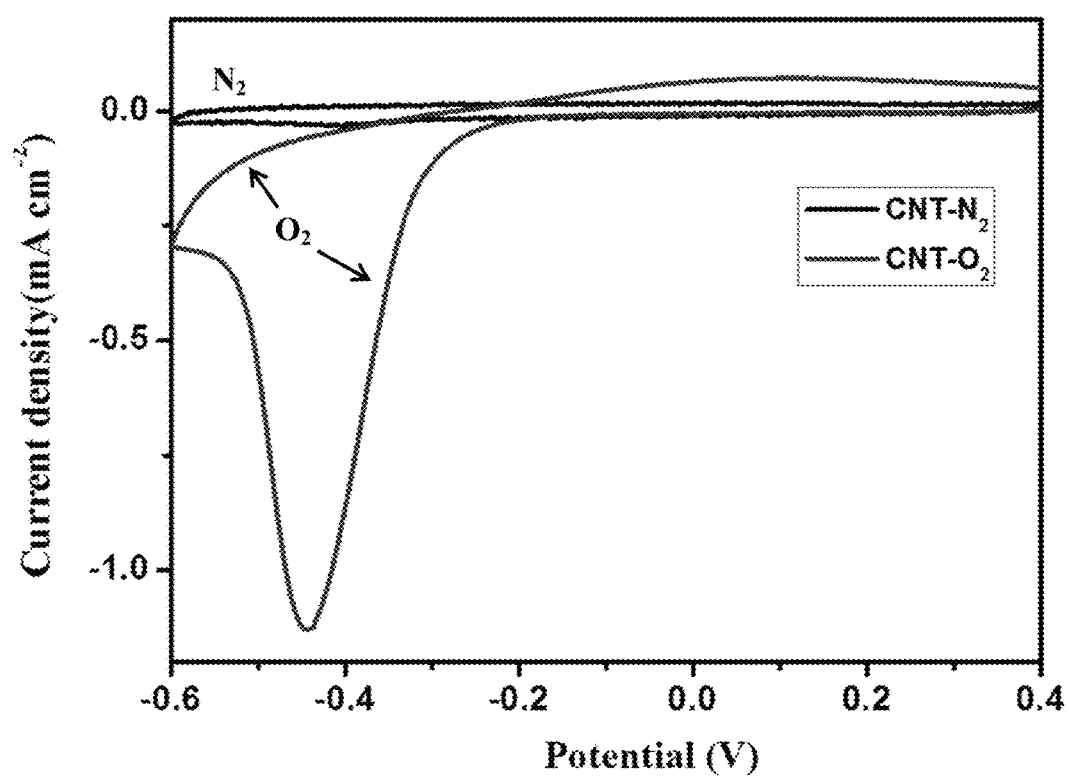
FIG. 15 shows CV data for the commercial MWCNT (without N-doping) of Example 2.
Figure 16:
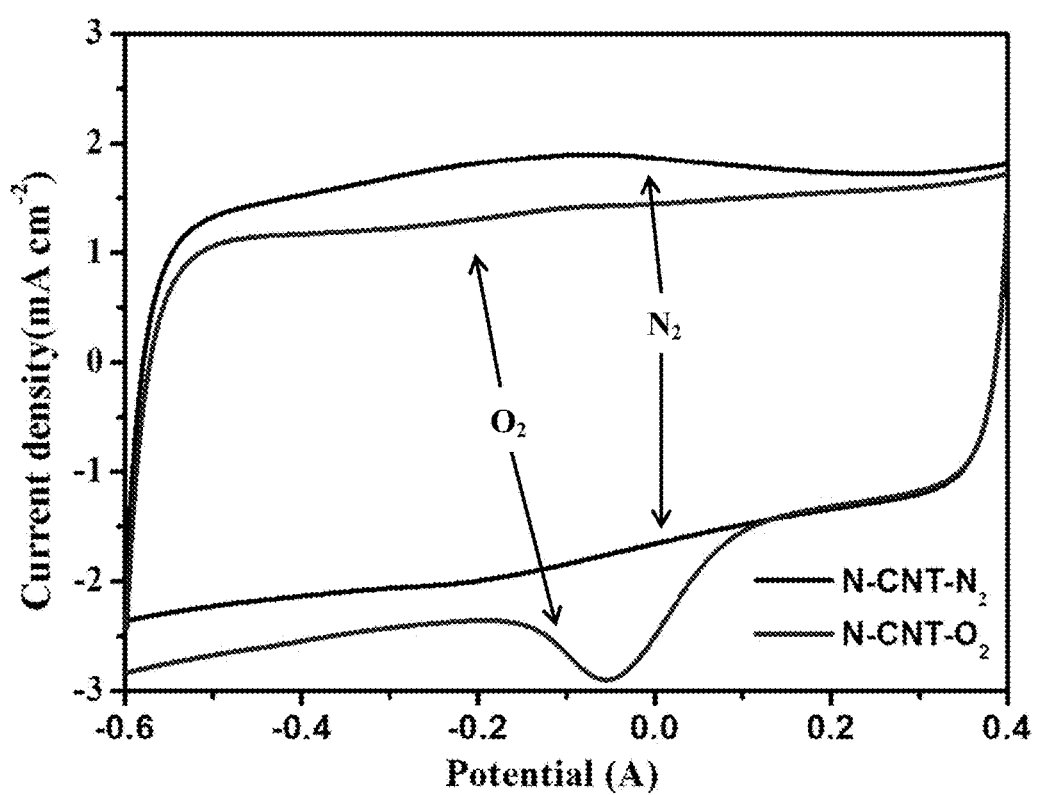
FIG. 16 shows CV data for the N-doped MWCNT (without removing Fe catalysts) electrode in $O_2$ and $N_2$ saturated 0.1 M PBS of Example 2.

To understand the key element in the nanocomposites for ORR, a series of comparative CV experiments were carried out on two different carbon nanotubes, specifically commercial MWCNTs, and nitrogen-doped MWCNTs with Fe nanoparticles (N-MWCNTs/Fe) prepared using a slightly modified method from the nanocomposites preparation (FIGS. 13 and 14). The N-MWCNT/Fe exhibited an increased peak potential (−0.05 V) of ORR compared with the MWCNT (−0.43 V) (FIGS. 15 and 16), which is much lower than that of the nanocomposite electrode (0.094 V) and the Pt/C electrode (0.078 V). The N-MWCNT/Fe showed a larger overpotential for ORR than that of the nanocomposites. Therefore, considering that the Fe-nanoparticle catalysts in N-MWCNT/Fe were not removed, it suggests that the doped N and core-$Fe_3C$ in the nanocomposites comprise a key role in improving the catalytic performance for ORR.

Calculating the kinetic parameter of ORR for the nanocomposite and Pt/C electrodes was done with the following calculations. The K-L plot presents the relationship of $J_{lim}^{-1}$ versus $\omega^{-1/2}$ and the K-L equation is shown below:

$$1/J_{lim} = 1/J_{Lev} + 1/J_k \quad (1)$$

where $J_{Lev} = 0.62nFCD^{2/3}v^{-1/6}\omega^{1/2}$ (n=number of electrons, F=Faraday=96486.4 Coulombs, C is the saturated concentration of $O_2$ in 0.1 M PBS ($1.26 \times 10^{-3}$ M) at room temperature, D is the diffusion coefficient of oxygen in water ($2.7 \times 10^{-5}$ cm$^2$/s), v is kinematic viscosity of the solution at room temperature (0.01 cm$^2$/s), and w is angular velocity of the disk ($2\pi N$), where N is the linear rotation speed); therefore, the equation (1) can evolve into the equation (2):

$$1/J_{lim} = 1/(0.62nFCD^{2/3}v^{-1/6}\omega^{1/2}) + 1/J_k \quad (2)$$

According to the K-L plot, the slope (K) can be used for calculating the electron number occurred in ORR, namely $n = 1/(0.62KFCD^{2/3}v^{-1/6})$, and $J_k$, the kinetic current density, can be evaluated through the interception (B) of the plot, namely $B = 1/J_k$, which determines the rate of kinetically limited reaction of ORR.

Example 3. Use of Nanocomposite in a Fuel Cell

Figure 17:
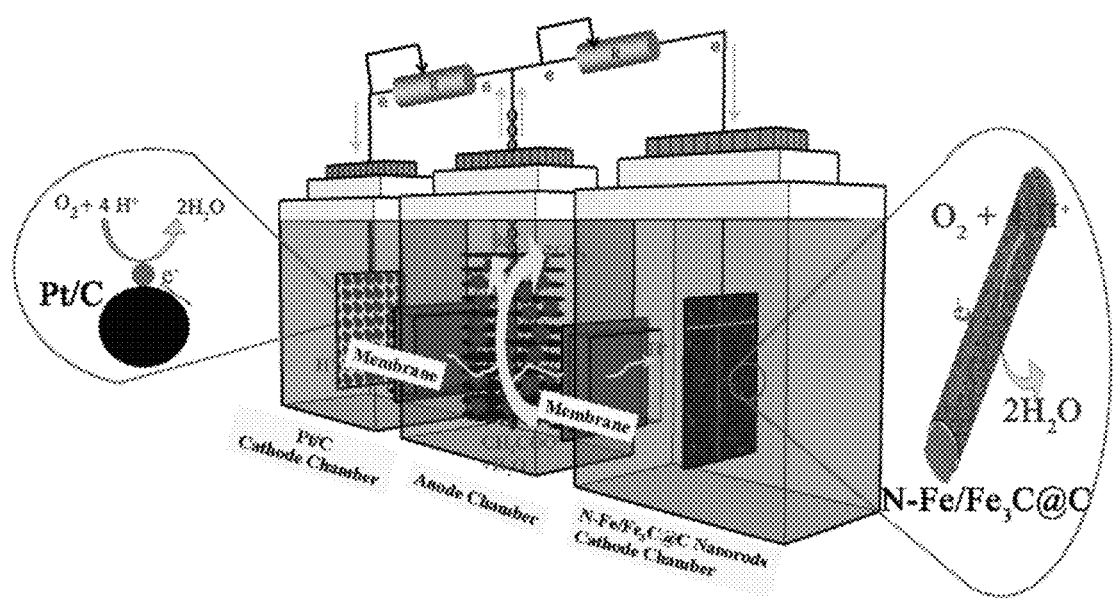
FIG. 17 shows a schematic diagram of the microbial fuel cell (MFC) with two testing cathode chambers and a shared anode of Example 3.

Described below is the use of the nanocomposites in a MFC (FIG. 17), and it was conducted in a conventional H configuration and consisted of three bottles. Two cathode chambers shared the middle anode chamber. The bottles were connected with a glass bridge containing an anion-exchange membrane (AMI-7001, available commercially from Membrane International, Inc., Glen Rock, N.J., USA) held by a clamp between the flattened ends of the two glass tubes (inner diameter was 6 cm). The anode chamber contained a carbon fiber brush (available commercially from Alfa Aesar, part #42107) electrode that had a two-wire Ti core serving as a current collector. Cathodes, made of carbon cloth (available commercially from Zoltek Companies, Inc., St. Louis, Mo., USA) with a projected surface area of 12 cm$^2$ and catalyst (0.5 mg/cm$^2$), were placed in the cathode chamber and connected to the external circuit by a titanium wire (0.68 mm in diameter, available commercially from Alfa Aesar). The anode chamber was filled with 135 mL of aqueous medium, containing 100 mM phosphate buffer (PBS; 2.45 g L$^{-1}$ $NaH_2PO_4 \cdot H_2O$ and 4.576 g L$^{-1}$ $Na_2HPO_4$), 10 ml L$^{-1}$ stock solution, and 1 ml L$^{-1}$ trace element. Acetate was added in the anolyte to reach 0.5 mg/L. The cathodic compartment was filled with an equal volume of 0.1 M PBS buffer, continuously saturated with air, and contained an Ag/AgCl reference electrode. All reactors operated in duplicate in fed-batch mode conditions at room temperature.

The cell voltage over different external resistors was recorded every 5 min by a digital multimeter (2700, available commercially from Keithley Instruments, Inc., Cleveland, Ohio, USA). Polarization curves were constructed using a Gamry Reference 600 potentiostat (available commercially from Gamry Instruments, Warminster, Pa., USA) at a scan rate of 0.5 mVs$^{-1}$. The cathode potential was continuously monitored using an Ag/AgCl reference electrode during the determination of the polarization curve. Electrochemical impedance spectroscopy (EIS) tests were conducted at the open circuit voltage (OCV) in a frequency range of 100 kHz to 5 MHz with an alternating current signal of a 10 mV amplitude. The impedance spectra for the cathode were recorded by using the cathode as the working electrode and the anode as the counter electrode. Additionally, the Ag/AgCl reference electrode placed in the cathode compartment was used as the reference electrode.

Figure 18:
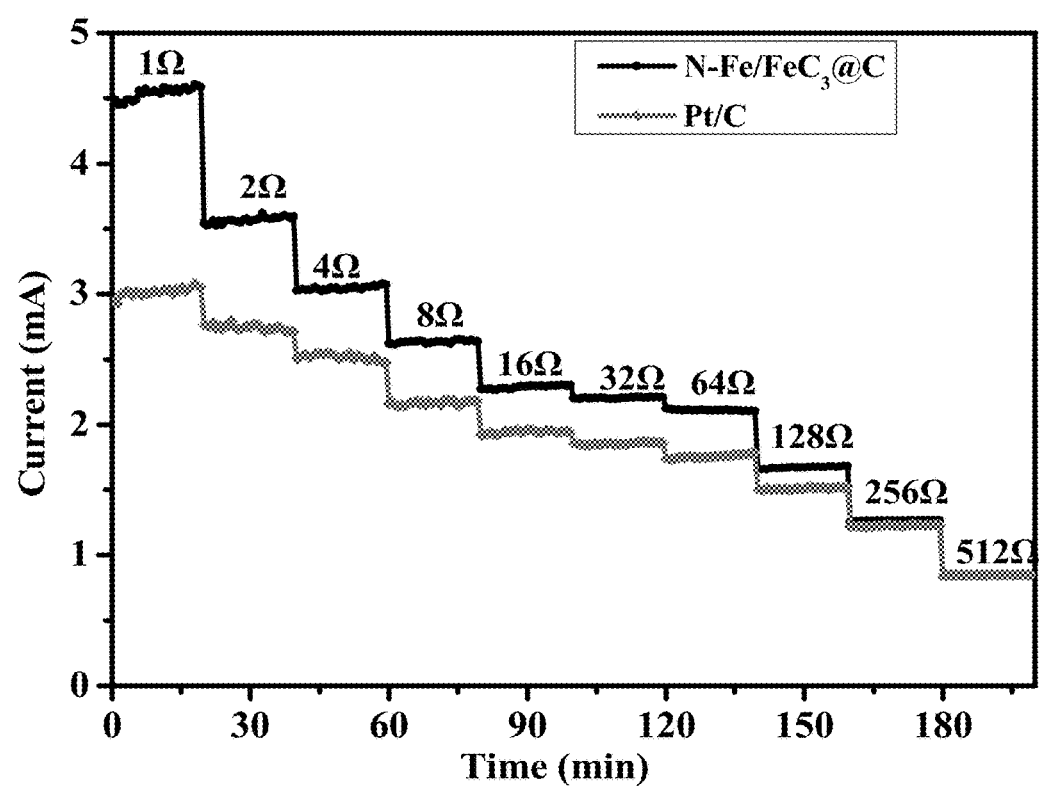
FIG. 18 is a plot of the output current versus time under different applied external resistance ($R_{ex}$) loadings in the N—Fe/Fe$_3$C@C-MFC and Pt/C-MFC of Example 3.
Figure 19:
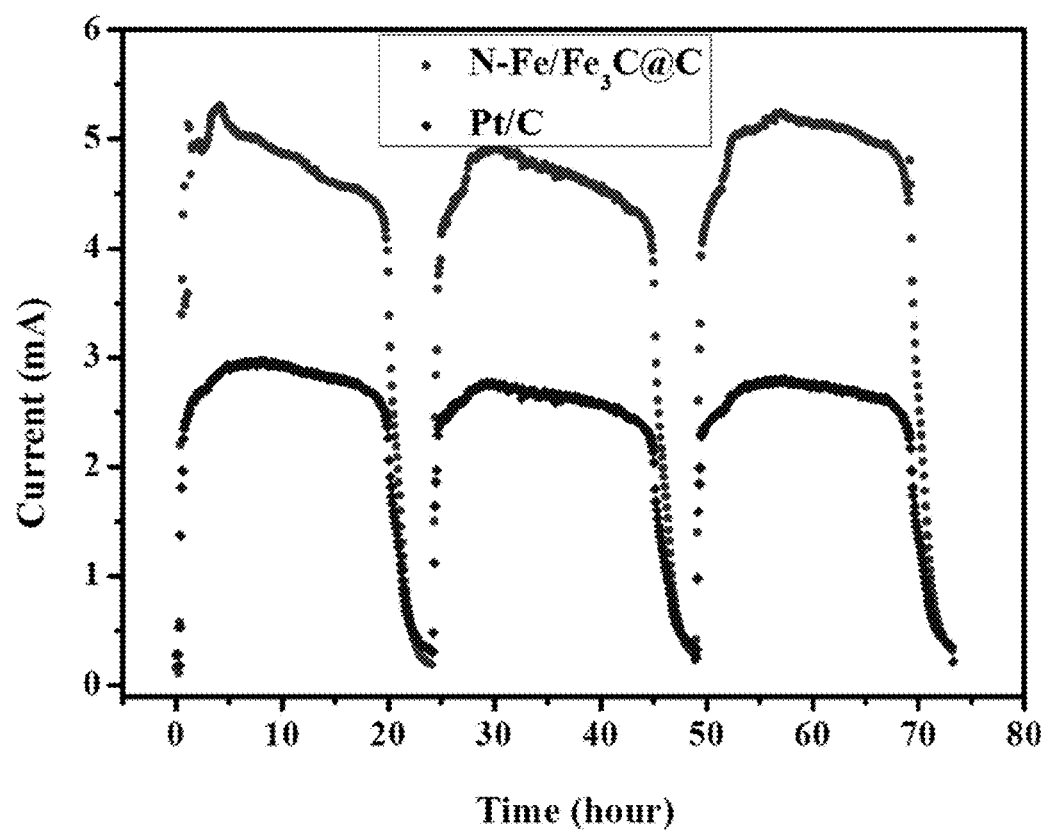
FIG. 19 is a plot of the output current versus time when loading a $R_{ex}$ of 1Ω in the N—Fe/Fe$_3$C@C-MFC and Pt/C-MFC of Example 3.
Figure 20:
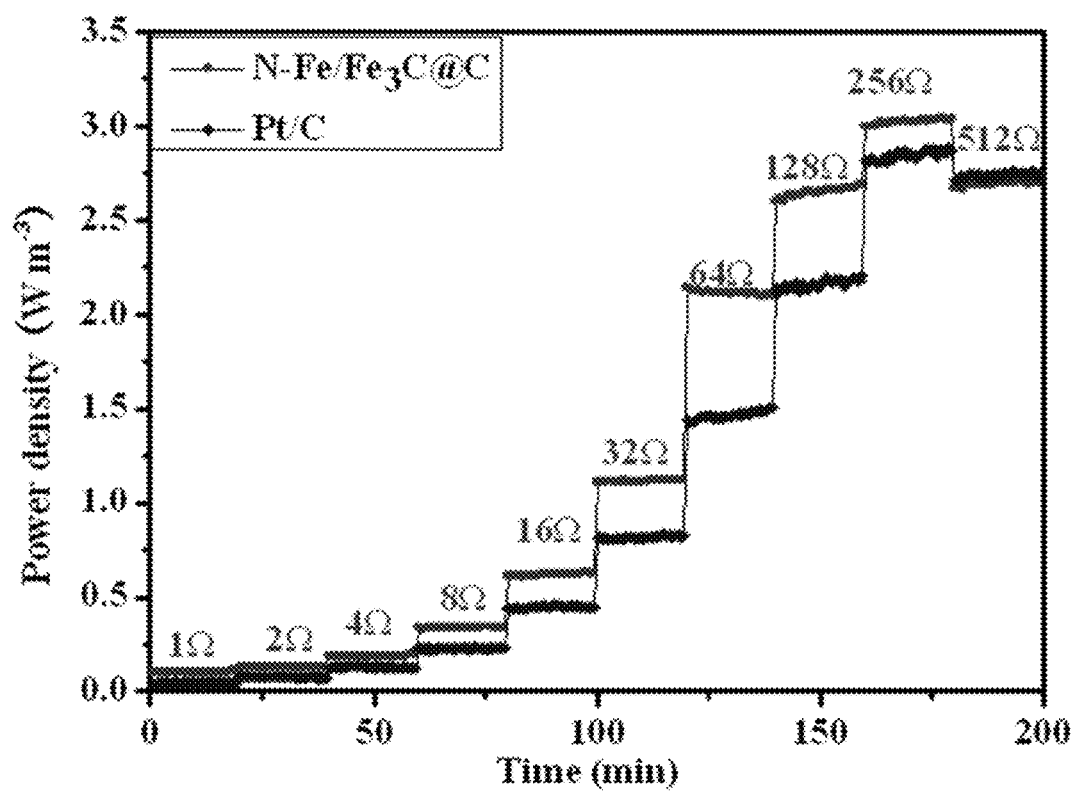
FIG. 20 is a plot of the output power density versus time when loading different $R_{ex}$ in the N—Fe/Fe$_3$C@C-MFC and Pt/C-MFC of Example 3.
Figure 21:
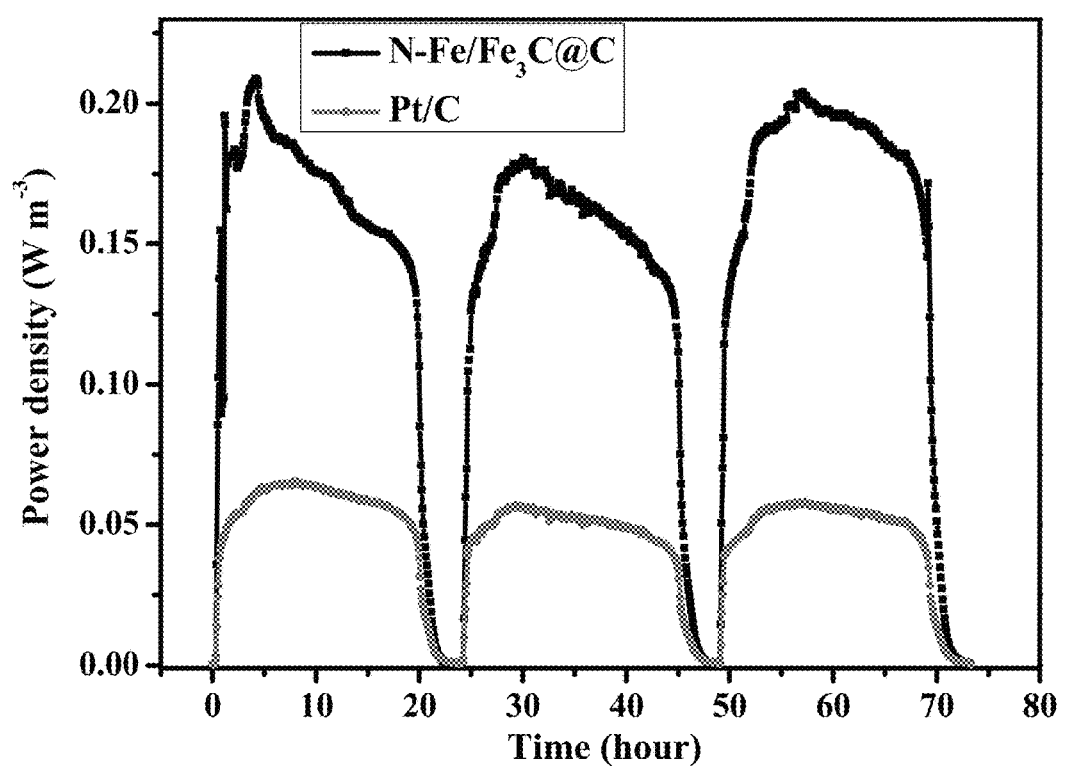
FIG. 21 is a plot of the output power density versus time when loading a $R_{ex}$ of 1Ω in the N—Fe/Fe$_3$C@C-MFC and Pt/C-MFC of Example 3.

The effect of the $R_{ex}$ on the current output was first investigated in both MFCs. FIG. 18 depicts the resulting current as a function of $R_{ex}$ in the nanocomposite-MFC and the Pt/C-MFC. The current output in MFCs decreased with the increase of $R_{ex}$, which can be understood according to Ohm's Law. The nanocomposite-MFC outperformed the Pt/C-MFC, as reflected by a larger current output, specifically with a low $R_{ex}$ of 1Ω (FIG. 19). The power density output was also calculated and normalized to the volume of the anode solution accordingly. The nanocomposite-MFC delivered a higher power density than the Pt/C-MFC (FIG. 20). Additionally, with loading a $R_{ex}$ of 1Ω, the nanocomposite-MFC generated an average power output density of 0.18 W m$^{-3}$, three times higher than the average power output (0.054 W m$^{-3}$) in the Pt/C-MFC (FIG. 21).

It should be noted that the difference in performance between the two MFCs decreased with an increase of $R_{ex}$. With a higher $R_{ex}$, the number of electrons getting to the cathode for ORR was smaller; therefore, the two MFCs showed almost comparable performance as they share the same anode. However, when the MFCs were loaded with a lower $R_{ex}$, more electrons passed through the external circuit and provided sufficient electrons for ORR at the cathode, and the kinetic rate of the ORR limited the final output current of the MFC. Based on the above results, it is reasonable to conclude that the nanocomposites have more energetic dynamics for ORR than the Pt/C catalyst, leading to a higher current and power density output at a lower $R_{ex}$.

Figure 22:
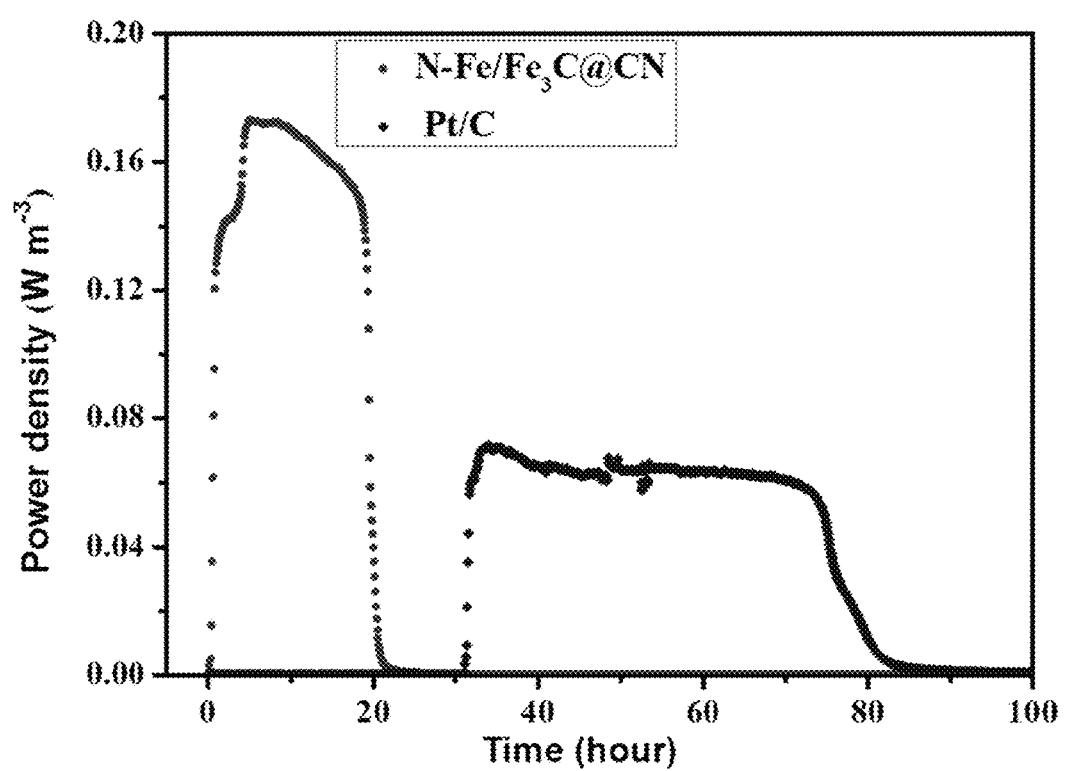
FIG. 22 is a plot of the output power density versus time when loading a $R_{ex}$ of 1Ω in the N—Fe/Fe$_3$C@C-MFC and Pt/C-MFC of Example 3.

The nanocomposite-MFC and Pt/C-MFC were also operated independently with a $R_{ex}$ loading of 1Ω under the same condition (FIG. 22). It took approximately 20 hours to consume the acetate fuels for the nanocomposite-MFC with a power density of about 0.16 W m$^{-3}$, while the Pt/C-MFC spent more than 50 hours in the same amount of acetate with a power density of around 0.06 W m$^{-3}$. This result demonstrated that the nanocomposites have the advantage in efficiently "capturing" and "consuming" electrons for catalyzing ORR compared with the Pt/C catalyst.

Figure 23:
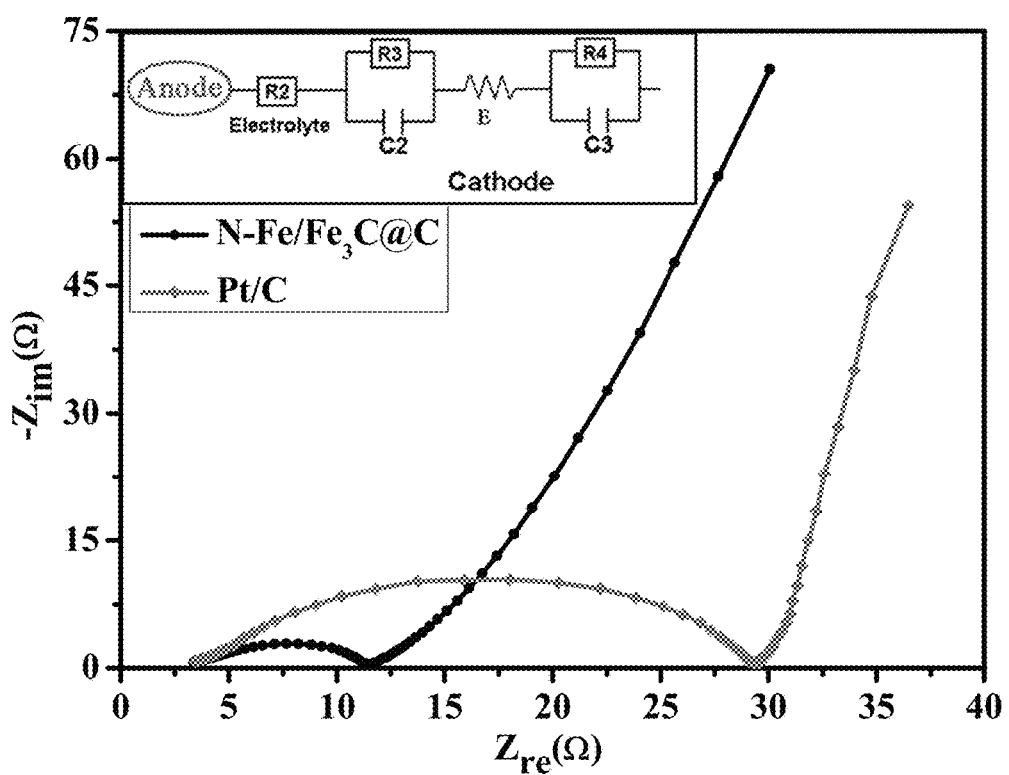
FIG. 23 shows a Nyquist curve of the N—Fe/Fe$_3$C@C and Pt/C cathode in MFC and the inset is a diagram of the corresponding equivalent circuit of Example 3.

The EIS was used to investigate the cathodes of the nanocomposite-MFC and Pt/C-MFC at their corresponding OCV. As presented in the Nyquist curves (FIG. 23), both plots show a depressed semicircle in the moderate frequency region. This corresponds to the charge transfer process at the cathode interface, which reflects the electrocatalytic activity for ORR in both electrodes. The nanocomposite-MFC displayed a charge transfer resistance ($R_{ct}$) of 8.9Ω, which is much lower than 25.7Ω of the Pt/C-MFC, suggesting that the former possesses an enhanced catalytic performance for ORR. The overall internal resistance ($R_i$) was then analyzed by fitting Nyquist data to a hypothetical equivalent circuit (inset of FIG. 23) to evaluate the measured impedance data. The EIS data with the two-time constant model revealed that $R_i$ for the nanocomposite cathode was 173.7Ω, while the Pt/C cathode had an $R_i$ of 309.6Ω.

Figure 24:
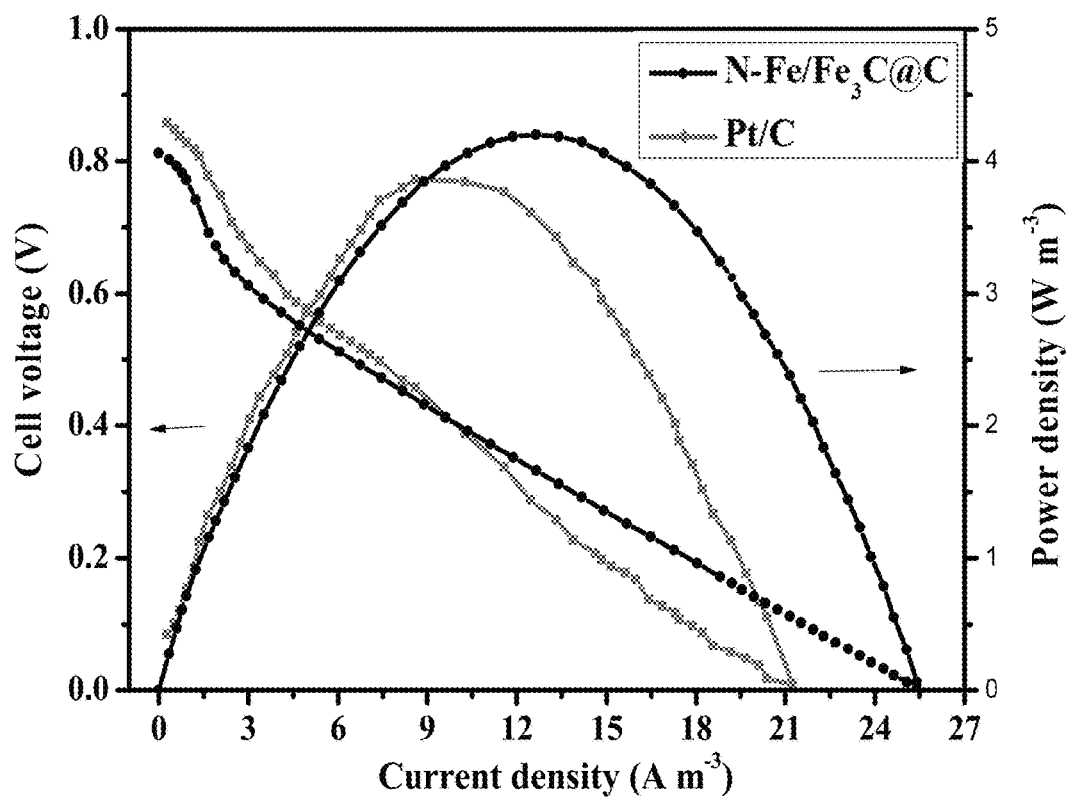
FIG. 24 shows the MFC polarization and power density curves with N—Fe/Fe$_3$C@C and PVC cathodes of Example 3.
Figure 25:
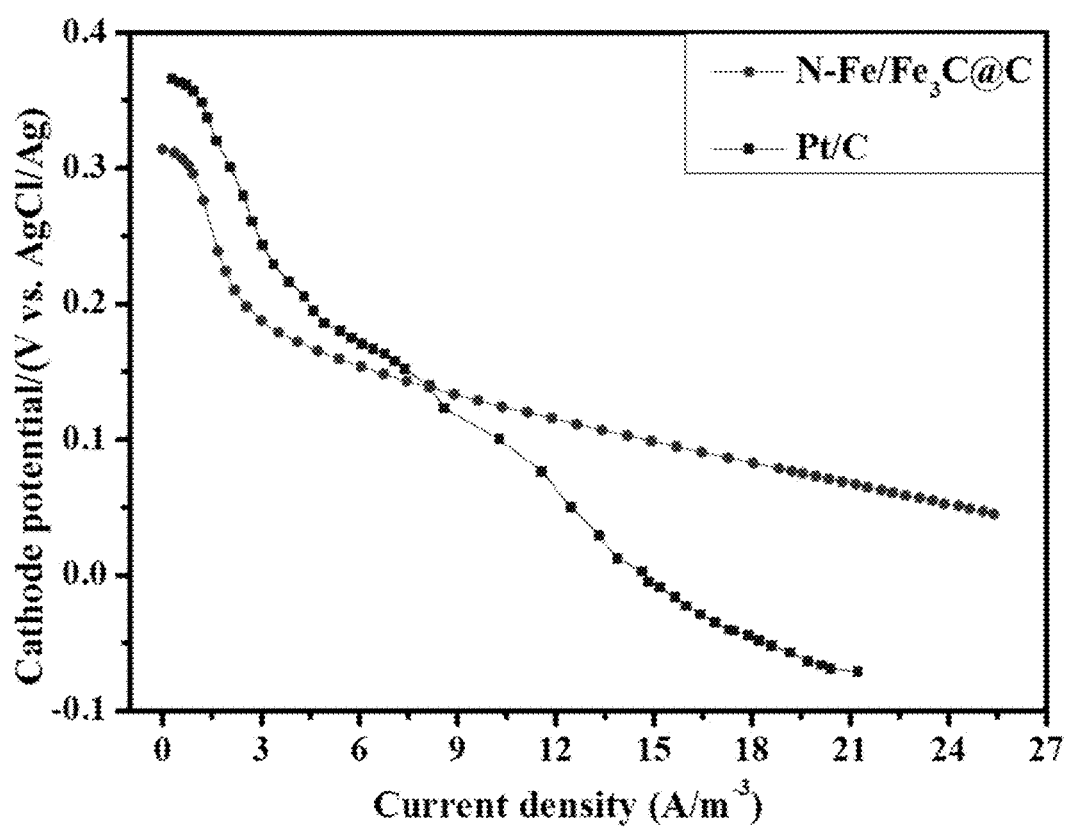
FIG. 25 is a plot of the current density versus cathode potential of the N—Fe/Fe$_3$C@C-MFC and Pt/C-MFC of Example 3.
Figure 26:
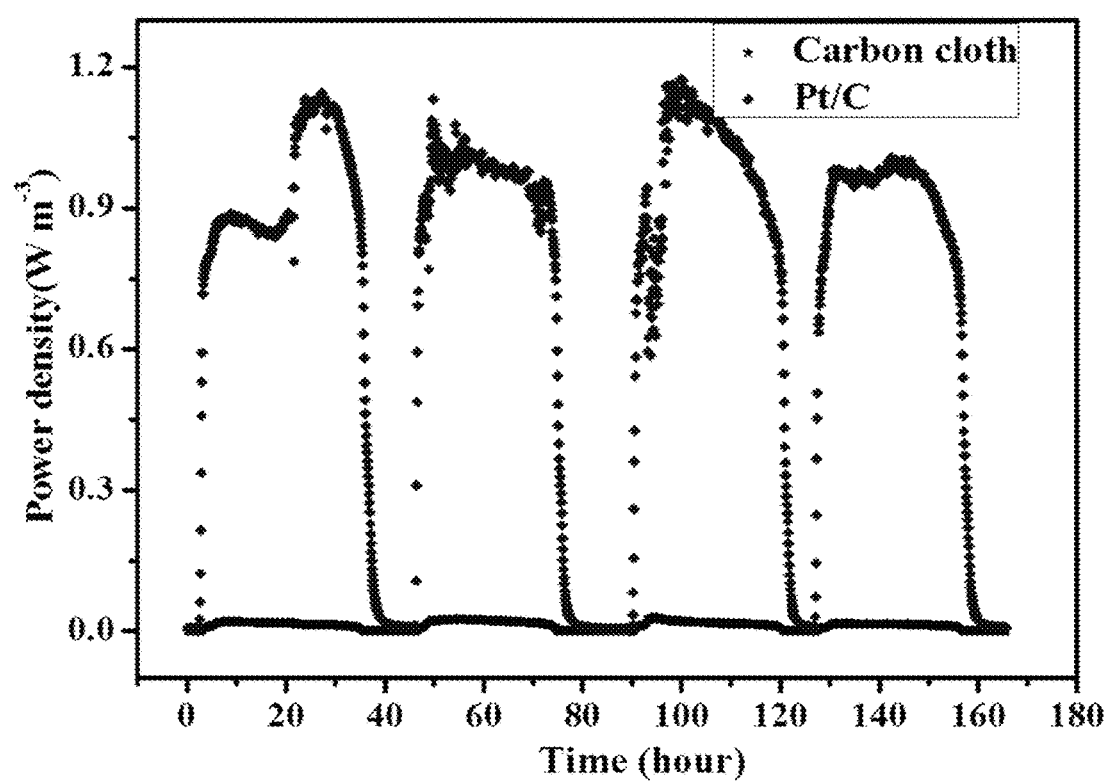
FIG. 26 is a plot of the output power density comparison between the Pt/C-MFC with a $R_{ex}$ loading of 20Ω and the carbon cloth-based cathode MFCs of Example 4.
Figure 27:
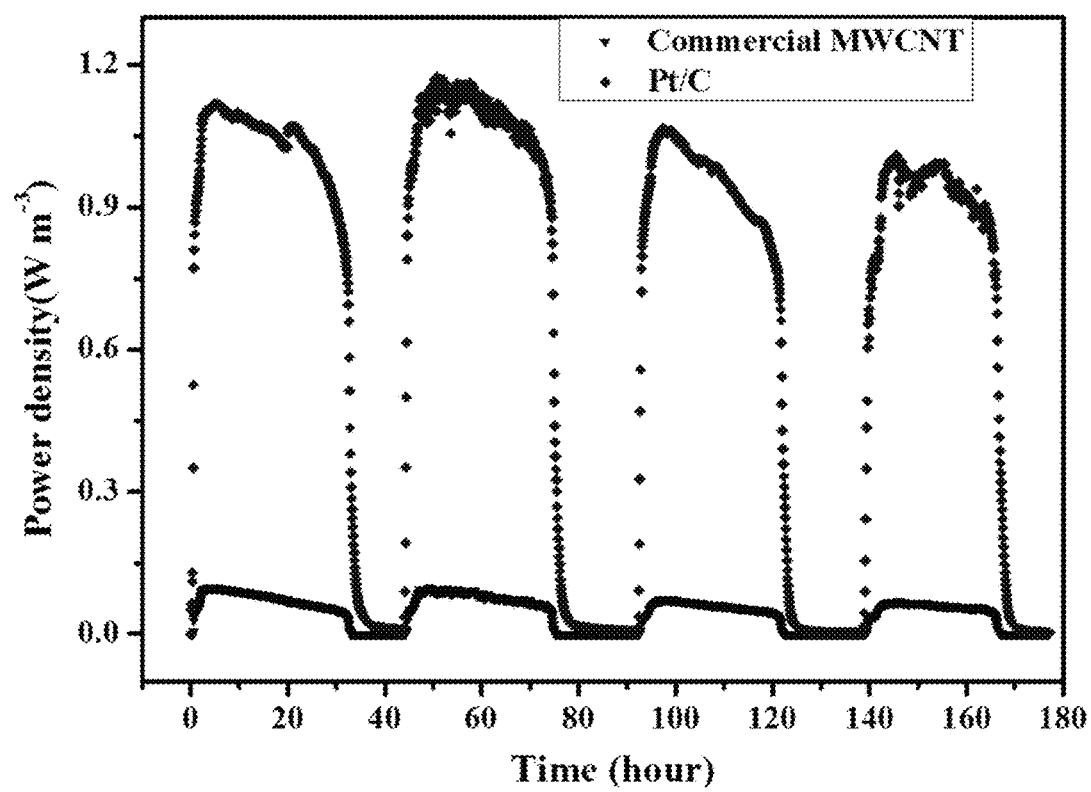
FIG. 27 is a plot of the output power density comparison between the Pt/C-MFC with a $R_{ex}$ loading of 20Ω and the commercial MWCNT-based cathode MFCs of Example 4.
Figure 28:
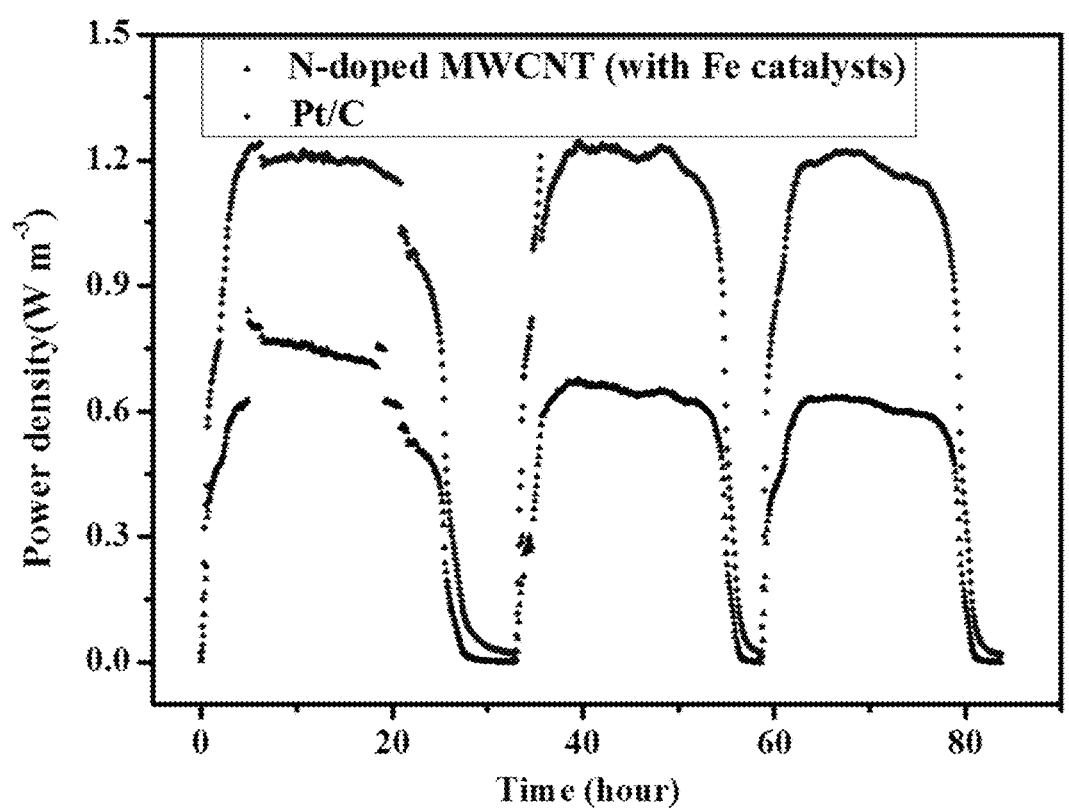
FIG. 28 is a plot of the output power density comparison between the Pt/C-MFC with a $R_{ex}$ loading of 20Ω and the N-MWCNT (with Fe nanoparticle catalysts)-based cathode MFCs of Example 4.
Figure 29:
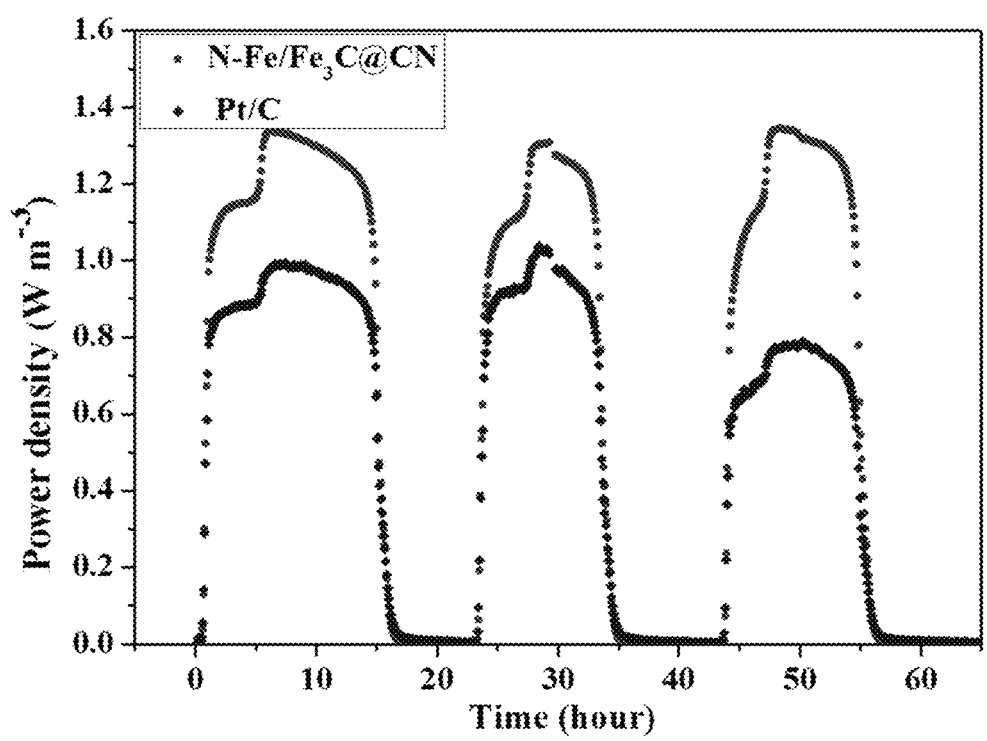
FIG. 29 is a plot of the output power density comparison with the Pt/C-MFC with a $R_{ex}$ loading of 20Ω and the N—Fe/Fe$_3$C@C-based cathode MFCs of Example 4.
Figure 30:
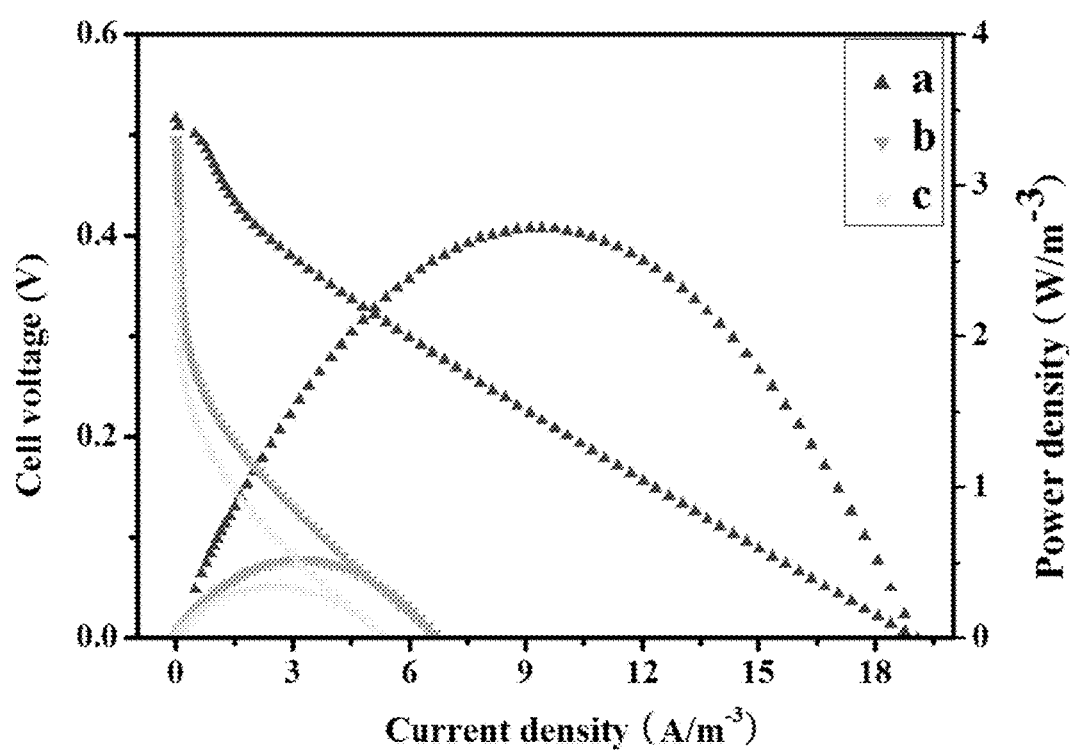
FIG. 30 shows MFC polarization and power density curves of the different materials used as the cathode in Example 4; a) N-MWCNT/Fe, b) commercial MWCNT, c) carbon cloth.

Polarization tests were examined at the end of the cycle test to further investigate the performance of both MFCs. As shown in FIG. 24, both MFCs presented a comparable open circuit voltage ($V_{oc}$) of around 0.82 V. The nanocomposite-MFC achieved a maximum power density ($P_{max}$) of 4.20 W m$^{-3}$ and a short-circuit current density ($I_{sc}$) of 25.39 A m$^{-3}$, which are higher than those of the Pt/C-MFC ($P_{max}$=3.98 W m$^{-3}$ and $I_{sc}$=21.23 A m$^{-3}$). The performance of MFCs was further assessed by monitoring the variation of cathode potential with current densities (FIG. 25). Generally, the potential of the nanocomposite was lower than that of the Pt/C cathode in the small current density range (0.25 A m$^{-3}$ to 8.90 A m$^{-3}$), but vice versa when the current density is above 8.90 A m$^{-3}$. These data suggest that the nanocomposite cathode can provide a comparable or even better performance in comparison with the Pt/C cathode, in accordance with the polarization curve and the CV results.

Example 4. Comparison of Different Materials for the MFC Cathode

A series of other materials, such as MWCNTs, N-MW-CNTs/Fe, and unmodified carbon cloth, were also constructed as the cathode for the MFC to compare with the Pt/C-MFC loading an $R_{ex}$ of 20Ω. The nanocomposite-MFC demonstrated the best performance in terms of various indices (i.e., $V_{oc}$, Isc, $P_{max}$) among all the different MFCs (FIG. 26-30 and Table 2).

TABLE 2

| Cathode | $E_{OC}$ (V) | $P_{max}$ (mW m$^{-3}$) | Isc (A m$^{-3}$) | $R_i$ (Ω) |
|---|---|---|---|---|
| N—Fe/Fe$_3$C@C | 0.82 | 4.20 | 25.39 | 173.7 Ω |
| Pt/C | 0.84 | 3.86 | 21.23 | 309.6 Ω |
| N-MWCNTs (Fe nano) | 0.68 | 2.71 | 19.09 | 345.1 Ω |
| MWCNTs | 0.66 | 0.52 | 6.66 | 1277.9 Ω |
| CC | 0.56 | 0.34 | 5.28 | 3749.2 Ω |

Figure 31:
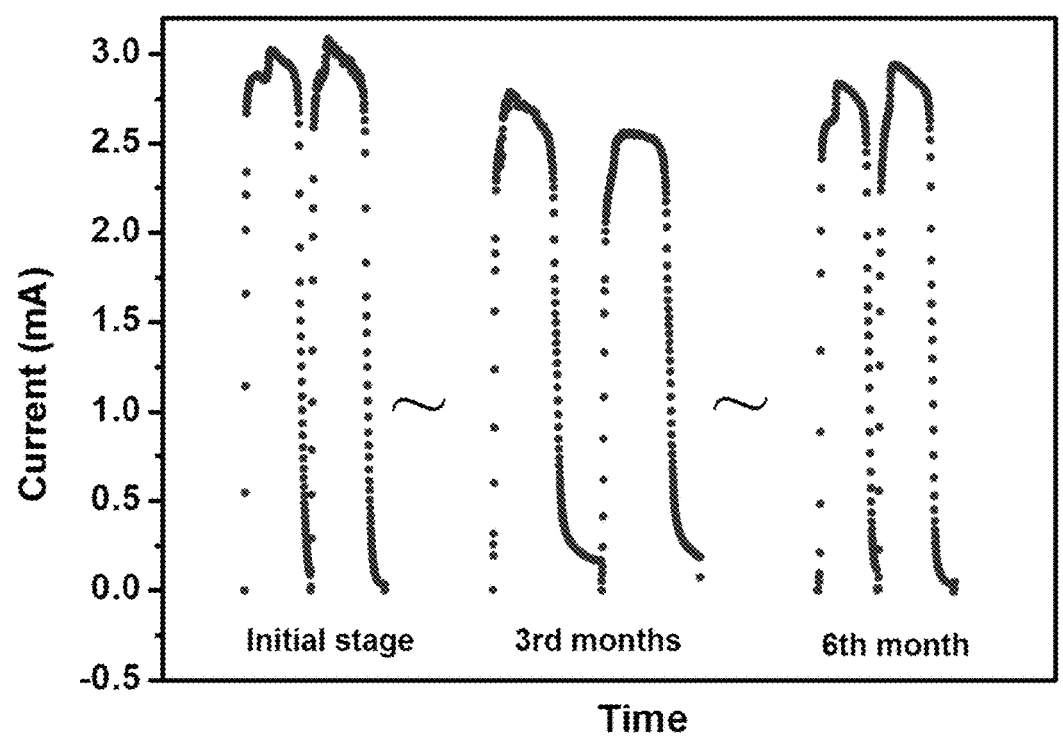
FIG. 31 is a plot of the output current versus time taken over the course of 6 months that shows long-term stability of the N—Fe/Fe$_3$C@C-based cathode MFCs with a loading $R_{ex}$ of 20Ω of Example 4.

Eoc: Open potential voltage
Isc: Short-circuit current density (relative to volume of anode solution)
Pmax: Maximum volumetric power
$R_i$: Interal resistance
$R_{ex\text{-}Pmax}$: The external resistance for obtaining the maximum volumetric power Furthermore, the nanocomposite-MFCs demonstrated good durability. For example, the nanocomposite-MFC did not show obvious degradation during an operation period of approximately six months (FIG. 31).

The invention claimed is:
1. A fuel cell comprising an Oxygen Reduction Reaction (ORR) catalyst comprising:
(a) a core comprising α-Fe and Fe$_3$C; and
(b) a graphitic carbon shell that is nitrogen-doped;
wherein the ORR catalyst is substantially free of iron oxide, as characterized by X-ray photoelectron spectroscopy (XPS), X-ray diffraction (XRD), or both.
2. The fuel cell of claim 1, wherein the ORR catalyst is a nanorod.
3. The fuel cell of claim 2, wherein a diameter of the nanorod is from about 20 nm to about 30 nm, and wherein a length of the nanorod is from about 1 μm to about 2 μm.
4. The fuel cell of claim 1, wherein the core comprises a crystalline structure.
5. The fuel cell of claim 1, further comprising one or more X-ray diffraction peaks that correspond to a presence of α-Fe.
6. The fuel cell of claim 1, further comprising one or more X-ray diffraction peaks that correspond to (002) planes of graphitic carbon.
7. The fuel cell of claim 1, further comprising X-ray diffraction peaks that correspond to crystalline planes of Fe$_3$C.
8. The fuel cell of claim 1, the ORR catalyst comprising about 48.5% iron, about 45.2% carbon, and about 6.3% nitrogen.
9. The fuel cell of claim 1, further comprising: one or more X-ray diffraction peaks that correspond to a presence of α-Fe;
one or more X-ray diffraction peaks that correspond to (002) planes of graphitic carbon; and
X-ray diffraction peaks that correspond to crystalline planes of Fe$_3$C.
10. A fuel cell comprising an Oxygen Reduction Reaction (ORR) catalyst comprising:
(a) a core comprising α-Fe and Fe$_3$C; and
(b) a graphitic carbon shell that is nitrogen-doped;
wherein the core comprises a catalytically effective amount of α-Fe.
11. A fuel cell comprising an Oxygen Reduction Reaction (ORR) catalyst comprising:
(a) a core consisting of α-Fe and Fe$_3$C; and
(b) a graphitic carbon shell that is nitrogen-doped.
12. The fuel cell of claim 1, further comprising an electrode comprising the ORR catalyst.
13. Use of the fuel cell of claim 1 to reduce oxygen.
14. A method of making a fuel cell of claim 1, the method comprising:
(a) forming a Fe$^{3+}$/cyanamide composite; and
(b) annealing the Fe$^3$ $^+$/cyanamide composite.
15. The method of claim 14, wherein forming the Fe$^{3+}$/cyanamide composite comprises drying at a temperature of less than about 500° C.
16. The method of claim 14, wherein annealing the Fe$^{3+}$/cyanamide composite comprises polymerizing the cyanamide at a temperature of less than about 600° C.
17. The method of claim 14, wherein annealing the Fe$^{3+}$/cyanamide composite comprises heating the Fe$^{3+}$/cyanamide composite to a temperature of about 750° C.
18. The method of claim 14, wherein annealing the Fe$^{3+}$/cyanamide composite comprises heating at a rate of about 4° C./min.
19. The method of claim 14, wherein annealing the Fe$^{3+}$/cyanamide composite comprises maintaining the temperature at about 750° C. for about 3 hours.
20. The method of claim 14, wherein annealing the Fe$^{3+}$/cyanamide composite comprises reducing Fe$^{3+}$ to Fe.

* * * * *